(12) United States Patent
Martorana

(10) Patent No.: US 6,876,326 B2
(45) Date of Patent: Apr. 5, 2005

(54) METHOD AND APPARATUS FOR HIGH-ACCURACY POSITION LOCATION USING SEARCH MODE RANGING TECHNIQUES

(75) Inventor: Marc J. Martorana, Lake Hiawatha, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 613 days.

(21) Appl. No.: 09/839,598

(22) Filed: Apr. 23, 2001

(65) Prior Publication Data

US 2002/0155845 A1 Oct. 24, 2002

(51) Int. Cl.[7] .................................................. G01S 3/02
(52) U.S. Cl. ..................................... 342/463; 342/458
(58) Field of Search ............................ 342/47–49, 126, 342/363, 387, 457–458; 340/7.5, 825.49

(56) References Cited

U.S. PATENT DOCUMENTS

| | | | | |
|---|---|---|---|---|
| 4,673,936 A | * | 6/1987 | Kotoh ........................ | 342/385 |
| 4,799,062 A | * | 1/1989 | Sanderford et al. .......... | 342/457 |
| 4,935,907 A | * | 6/1990 | Friedman ................ | 340/825.49 |
| 5,157,408 A | * | 10/1992 | Wagner et al. ............... | 342/399 |
| 6,396,434 B1 | * | 5/2002 | Takase et al. .................. | 342/48 |
| 6,453,168 B1 | * | 9/2002 | McCrady et al. ........... | 342/457 |
| 2001/0053699 A1 | * | 12/2001 | McCrady et al. ............ | 455/513 |

FOREIGN PATENT DOCUMENTS

| GB | 2129643 A | 5/1984 | | |
|---|---|---|---|---|
| WO | WO98/10307 | 3/1998 | | |
| WO | WO01/10154 A1 | 2/2001 | | |
| WO | WO 01/78032 A1 | * | 10/2001 | ........... G08B/21/04 |

OTHER PUBLICATIONS

P.J. Forey, Search and rescue transponders, Conference Proceedings, MM 92, Brighton, UK, 14–15, Microwave Exhibitions an Publishers, p. 79–83, Oct. 1992.*

European Search Report (3 pages).

* cited by examiner

Primary Examiner—Bernarr E. Gregory
Assistant Examiner—F H Mull
(74) Attorney, Agent, or Firm—Edell, Shapiro & Finnan, LLC

(57) ABSTRACT

A high accuracy search and tracking system that uses a round-trip messaging scheme in which the time of arrive (TOA) of ranging signals is accurately determined to yield the range estimates between a target communications device and one or more search communications devices. Successive ranging estimates are used by a search device to home in upon the target device. The physical location pinpoint communications system can be used alone, or in combination with other location estimation systems that can be used initially, or throughout the search and tracking process to pinpoint the physical location of the target device. The search radio(s) transmits ranging signals to the target radio which responds by transmitting reply ranging signals. Upon reception of the reply ranging signal, the search radio determines the range to the reference radio from the signal propagation time. Errors in TOA estimates can be minimized using advanced processing techniques, if required.

42 Claims, 11 Drawing Sheets

METHOD AND APPARATUS FOR HIGH-ACCURACY POSITION LOCATION USING SEARCH MODE RANGING TECHNIQUES

BACKGROUND OF THE INVENTION

1. Field of the Invention

The present invention relates to the enhancement of position estimating systems with the ability to pinpoint the physical location of a target communication device using direct ranging techniques between search communication devices and the target communication device.

2. Description of the Related Art

The capability to rapidly and accurately estimate the physical position of a mobile communication device would be of great benefit in a variety of applications. In a military context, it is desirable to know the location of military personnel and/or equipment during coordination of field operations and rescue missions, including scenarios where signals of conventional location-determining systems, such as global location system (GPS) signals, may not be available (e.g., within a building). More generally, appropriately equipped mobile communication devices can be used to track the location of personnel and resources located both indoors or outdoors, including but not limited to: police engaged in tactical operations; firefighters located near or within a burning building; medical personnel and equipment in a medical facility or en route to an emergency scene, including doctors, nurses, paramedics and ambulances; and personnel involved in search and rescue operations. An integrated location communication device would also allow high-value items to be tracked and located, including such items as personal computers, laptop computers, portable electronic devices, luggage, briefcases, valuable inventory, and stolen automobiles. In urban environments, where conventional location determining systems have more difficulty operating, it would be desirable to reliably track fleets of commercial or industrial vehicles, including trucks, buses and rental vehicles. Tracking of people carrying a mobile communication device is also desirable in a number of contexts, including, but not limited to: children in a crowded environment such as a mall, amusement park or tourist attraction; location of personnel within a building; and location of prisoners in a detention facility.

The capability to estimate the position of a mobile communication device also has application in locating the position of cellular telephones. Unlike conventional land-based/wire-connected telephones, the location of conventional cellular telephones cannot be automatically determined by emergency response systems (e.g., the 911 system in the United States) when an emergency call is placed. Thus, assistance cannot be provided if the caller is unable to speak to communicate his or her location (e.g., when the caller is unconscious, choking or detained against will). The capability to determine the location of cellular telephones can be used to pinpoint the location from which an emergency call has been made. Such information can also be used to assist in cell network management (for example, by factoring each mobile communication device's location into message routing algorithms).

The aforementioned needs are addressed by two co-pending U.S. patent applications: Ser. No. 09/365,702, entitled "Method and Apparatus for Determining the Location of a Mobile Communication Device Using Low Accuracy Clocks," filed Aug. 2, 1999; and Ser. No. 09/777,625, entitled "Method and Apparatus for Determining the Location of a Mobile Communication Device," filed Feb. 6, 2001. Both applications are hereby incorporated by reference in their entirety and are hereinafter referred to, jointly, as "patent applications '702 and '625."

Patent applications '702 and '625 disclose a spread spectrum based technology that allows individuals and/or equipment to be tracked to very close tolerances, even within heavily obstructed environments, such as within "urban canyons" or within modem buildings. The system disclosed employs two-way transmission of spread spectrum ranging signals between mobile communication devices having relatively low accuracy clocks, to estimate rapidly and accurately the location of the mobile communication devices in the presence of severe multipath interference. The technology is small enough to be embedded in radios and/or cell phones, and allows ranging/tracking capabilities to be provided without disrupting other voice or data communications supported by the same device. Prototype devices have demonstrated performance capabilities under a variety of obstructed, multipath conditions.

The disclosed location estimation system accurately and reliably estimates the three-dimensional location of a handheld, portable or vehicle-mounted, spread spectrum communication device within milliseconds without interruption of voice or data communications. Using spread spectrum waveforms and processing techniques, the disclosed system is capable of estimating location to an accuracy of less than one meter in a severe multipath environment. More particularly, these systems employ a two-way, round-trip ranging signal scheme in which the time of arrival of the ranging signals is precisely determined to yield accurate range estimates used to calculate the location of a mobile radio via trilateration.

In these systems, a master mobile radio transmits outbound ranging pulses to plural reference radios which respond by transmitting reply ranging pulses that indicate the location of the reference radio and the pulse turn around time (i.e., the time between reception of the outbound ranging pulse and transmission of the reply ranging pulse). Upon reception of the reply ranging pulse, the master radio determines the signal propagation time, and hence range, by subtracting the turn around time and internal processing delays from the elapsed time between transmission of the outbound ranging pulse and the time of arrival of the reply ranging pulse. In this manner, the individual radios do not need to be synchronized to a common time reference, thereby eliminating the need for highly accurate system clocks required in conventional time-synchronized systems. The brief ranging pulses can be interleaved with voice and data messages or incorporated into a messaging scheme in a non-intrusive manner to provide location detection capabilities without disruption of voice and data communications.

Time of arrival of ranging pulses must be precisely estimated. By performing internal delay calibration, errors caused by difficult-to-predict internal transmitter and receiver delay variations can be minimized. The doppler shift of each arriving ranging pulse is estimated and compensated for in determining the pulse's time of arrival. State-of-the-art spread spectrum chipping rates and bandwidths to reduce multipath interference, and yet take advantage of existing hardware and software to carry out portions of the TOA estimation process, where practical. Leading edge curve fitting is used to accurately locate the leading-edge of an acquisition sequence in the ranging pulse in order to further reduce effect of multipath interference on TOA estimates. Frequency diversity is used to orthogonalize multipath interference with respect to the direct path signal, wherein an optimal carrier frequency and phase is identified and used to estimate the TOA to minimize the impact of multipath interference.

The systems disclosed in the aforementioned patent applications are self-healing. Unlike conventional systems, which require communication with a certain set of fixed-location reference radios, the systems disclosed can use a set of reference radios that includes fixed and/or mobile radios, wherein the set of radios relied upon to determine the location of a mobile communication device can vary over time depending on transmission conditions and the location of the mobile communication device. Any combination of fixed or mobile radios of known locations can be used as the reference radios for another mobile radio in the system, thereby providing adaptability under varying conditions.

The location of the disclosed communications devices can be estimated with high levels of accuracy and reliability. Depending upon the levels of position accuracy, low probability of detection, and/or confidentiality required, communications devices of varying capability can be assembled based upon a modular architecture that leverages standard commercial hardware and communications protocols, where applicable. For example, disclosed curve fitting and frequency diversity features need only be included in a communications device if the enhanced location accuracy provided by such features is required. By such modular design, the disclosed technology is capable of supporting the most stringent of military special force requirements, as well as the reduced operational requirements demanded by civilian search and rescue operations. The ranging and location techniques presented are useful in wide variety of applications, including location and/or tracking of people and items such as: military personnel and equipment, emergency personnel and equipment, valuable items, vehicles, mobile telephones, children, prisoners and parolees.

Real world conditions will always exist in which position estimates, by even the most sophisticated location estimation system, will not be able to assure success in "physically locating" a target communications device. Factors such as long distances and obstructions between the target devices and reference devices, signal degradation, and multipath distortion will impact the accuracy of trilateration based location estimates, despite the sophistication of the system deployed. Furthermore, mission environments are often complicated by poor human operating conditions, such as darkness, smoke, heavy fog, and/or physical obstructions, resulting in situations in which even the smallest of position estimate inaccuracy can cause a search to be unsuccessful. Even highly sophisticated position estimating techniques, such as those disclosed in patent applications '702 and '625, may yield insufficient accuracy to guarantee operational success in a number of mission environments, such as those described in the following scenarios.

A skier is buried under several feet of snow, somewhere within a two acre snow field, and there are no reference communications devices inside the valley in which the avalanche occurred. Under such conditions, a conventional position estimating system, is unlikely to provide sufficient accuracy to allow rescuers to physically locate the buried individual before he suffocates. Similar difficulties arise in a scenario in which an escaped convict, who had been previously equipped with a tracking device, has taken measures to conceal himself within the "urban canyons" of a large metropolis. In such environments the exterior walls of city buildings create serious signal degradation and multipath conditions. Sophisticated, trilateration based location estimation techniques alone, in such an environment, may not provide sufficient accuracy to allow law enforcement officers to plan a safe approach by which to apprehend the convict, thereby resulting in increased risk to law enforcement officers. A final scenario requires that an electronically tagged crate stored in a warehouse, a ship's cargo hold, or other highly refractive, multipath environment, be quickly located. The inability to guarantee the ability to locate a target device in such a worst case scenario could result in the rejection of radio transponder technology that would otherwise have proven to be a highly effective tool for use in transit material tracking.

In all these scenarios, the position estimate accuracies are affected by a number of factors, including distance, signal degradation, and multipath distortion. Even if multiple position estimation communications devices were moved into the surrounding area, the initial position estimate may still not provide sufficient accuracy to assure a successful search. In many situations it is not possible to increase the number of, or to properly locate, additional communications device reference points.

Increasing the accuracy of the position estimation system may increase the cost, size, weight, and power consumption of the respective communications devices used in the 1 position estimation system, but may not assure success in physically locating a target device under all possible conditions. Furthermore, such increased accuracy would be unnecessary in support of a large number of the missions for which such location estimation systems are intended.

Accordingly, there remains a need to increase the probability of a successful physical search, despite the level of accuracy achieved by the position estimation system used to guide the search device to the general vicinity of the target device. Such a capability would allow a less accurate position estimation system to be used without sacrificing the probability of a successful search. Operationally viable position estimation systems can be assembled using communications devices of lessor and/or varying position estimation accuracy, allowing optimization of cost, size, weight, and power related considerations, while providing extremely high assurance that a designated device can be quickly and effectively located.

SUMMARY OF THE INVENTION

Therefore, in light of the above, and for other reasons that become apparent when the invention is fully described, an object of the present invention is to provide a mobile communications device with the ability to pinpoint the physical position of a target communications device using ranging techniques, and, more particularly, to enhance the capability of existing location estimating systems with the ability to pinpoint the physical position of a target communications device.

A further object of the present invention is to incorporate accurate ranging capabilities into a compact, handheld or portable mobile communication device capable of tracking and homing in a wide array of applications, including the tracking and location of people and items such as: military personnel and equipment, emergency personnel and equipment, valuable items, vehicles, mobile telephones, children, prisoners and parolees.

Yet a further object of the present invention is to allow mobile communication device ranging capabilities to be remotely or manually engaged and to do so without disrupting simultaneous voice and/or data communications services supported by the device.

A still further object of the present invention is to integrate into a single mobile communication device the ability to:

calculate and store its own position/time estimates using various position estimation techniques; receive and store estimates pertaining to its own position/time from at least one of a variety of external sources; receive and/or store multiple estimates pertaining to the position/time of one or more communications devices, including itself; and, the to exchange (i.e., transmit, receive and store) past and last known position/time estimates with other communications devices.

Another object of the present invention is to provide search communications devices with the ability to project the probable course and physical position of a target communications device based upon last known position/time estimates pertaining to the target device.

Yet another object of the present invention is to augment a mobile search device with the ability to pinpoint the physical position a mobile communication device in a variety of environments, including urban areas and inside buildings where multipath interference can be severe.

Still another object of the present invention is to minimize the effects of interference caused by multipath signal propagation upon the ability to accurately determine the range between a search device and a target device, even under severe multipath conditions.

It is a further object of the present invention to minimize design and manufacturing costs associated with providing an accurate ranging capabilities within a compact, handheld or portable mobile communication device by maximizing use of the known hardware and software capabilities of existing mobile communication devices.

The aforesaid objects are achieved individually and in combination, and it is not intended that the present invention be construed as requiring two or more of the objects to be combined unless expressly required by the claims attached hereto.

In accordance with the present invention, existing position estimation systems are provided with the ability to physically pinpoint the location of individual communications devices using highly accurate ranging capabilities. Existing position estimation system capabilities, which include but are not limited to those disclosed in patent application '702 and '625, are used to estimate, with a high degree of accuracy, the locations of the respective mobile communications devices.

An individual, or unmanned automated mobile device, equipped with such a mobile communication device, is able to effectively home in on the target communication device by moving in the direction of the target device until the calculated range is zero, or until the target device is within visible or tactile range.

Using spread spectrum waveforms and processing techniques, the system allows designated search communications devices to physically locate and/or apprehend a designated target communications device even in a severe multipath environments. More particularly, the system of the present invention employs a two-way, round-trip ranging signal scheme in which the time of arrive of the ranging signals is used to accurately calculate the range of a mobile communications device.

A communication device, with search mode enabled, transmits outbound ranging pulses to a target reference device which responds by transmitting reply ranging pulses that indicates the location of the target reference device and the pulse turn around time (i.e., the time between reception of the outbound ranging pulse and transmission of the reply ranging pulse). Upon reception of the reply ranging pulse, the master search radio determines the signal propagation time, and hence range, by subtracting the turn around time and internal processing delays from the elapsed time between transmission of the outbound ranging pulse and the time of arrival of the reply ranging pulse. In this manner, the individual radios do not need to be synchronized to a common time reference, thereby eliminating the need for highly accurate system clocks required in conventional time-synchronized systems. The brief ranging pulses can be interleaved with voice and data messages or incorporated into a messaging scheme in a non-intrusive manner to provide location detection capabilities without disruption of voice and data communications. To provide high accuracy range estimates, the time of arrival of the ranging pulses are precisely estimated. By performing internal delay calibration, errors caused by difficult-to-predict internal transmitter and receiver delay variations can be minimized.

The system uses state-of-the-art spread spectrum chipping rates and bandwidths to reduce multipath interference, taking advantage of existing hardware and software to carrying out a portion of the TOA estimation processing. Leading edge curve fitting can be used to accurately locate the leading-edge of an acquisition sequence in the ranging pulse in order to further reduce effect of multipath interference on TOA estimates. Frequency diversity can be used to orthogonalize multipath interference with respect to the direct path signal, wherein an optimal carrier frequency and phase can be identified and used to estimate the TOA to minimize the impact of multipath interference.

The ranging and pinpoint position technique of the present invention is useful in wide variety of applications, including location and/or tracking of people and items such as: military personnel and equipment, emergency personnel and equipment, valuable items, vehicles, mobile telephones, children, prisoners and parolees, even under the harshest of physical conditions, such as heavy smoke, darkness, and/or physical/visible obstructions that would otherwise jeopardize search results.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION OF THE PREFERRED EMBODIMENTS

Figure 1:
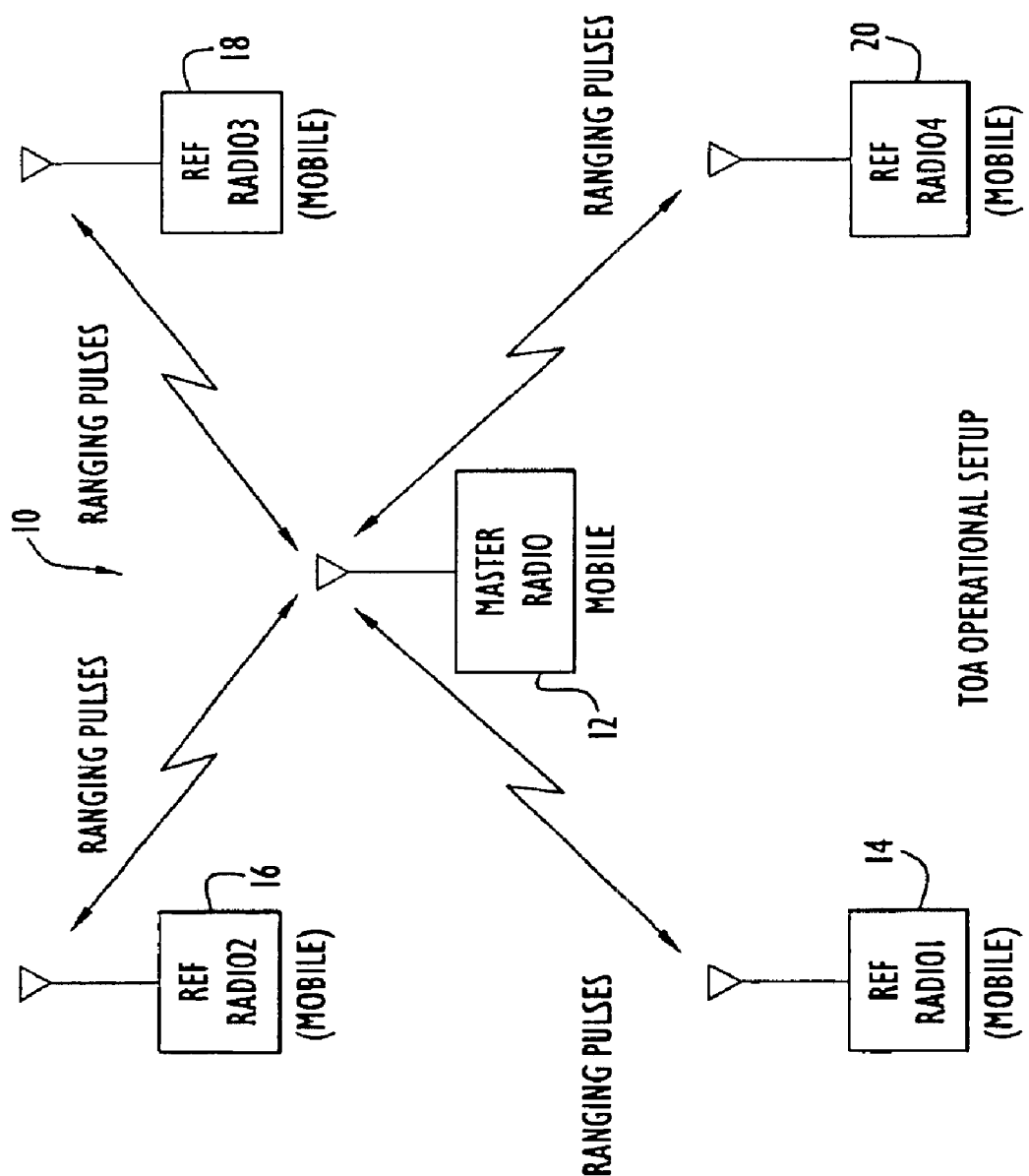
FIG. 1 is a diagrammatic view of the operational setup of a physical position estimation system in accordance with an exemplary embodiment of the present invention.

In accordance with the present invention, a handheld or portable communication device that provides accurate and reliable range information to an identical, or similar, device, within milliseconds, without interruption of audio, video or data communications. Using spread spectrum waveforms and processing techniques, the present invention is capable of determining highly accurate range information in a severe multipath environment. This range information allows the handheld or portable device to "home in" upon a designated target device.

In particular, a two-way time-of-arrival messaging scheme is employed to achieve the aforementioned objectives, while eliminating the need for highly accurate system clocks required in conventional time-synchronized systems. By performing internal delay calibration, Doppler compensation, frequency diversity and leading-edge-of-the-signal curve fitting, a highly accurate estimate of ranging signal time of airival can be obtained, ensuring the accuracy of the range calculations based thereon. More particularly, the present invention discloses a new operational capability (hereinafter referred to as "search mode") for devices equipped with range finding capabilities, including but not limited to, those disclosed in patent applications '702 and '625. The search mode allows a device to employ such ranging techniques, to "home in" upon the physical position of an identified target device when in the vicinity of the target device. As used herein and in the claims, the term "vicinity" refers to a region around a target communication device in which two-way communications can be effected between the target communication device and another communication device (e.g., a mobile search device).

The disclosed invention may be used between two or more isolated devices. However, in the exemplary embodiment disclosed herein, the invention is integrated within devices deployed in association with a position estimating system, such as those disclosed in patent applications '702 and '625. The position estimating system is used to guide searchers to the approximate location of the target device. Once the searcher has achieved physical proximity to the target device, two way ranging between the search device and target device is engaged to allow the search device to home in upon the target device's exact position.

As mentioned to above, the high accuracy search mode capability addressed by the present invention can employ the same underlying technology that is used to support trilateration based location estimation systems. Therefore, the techniques addressed in this discussion of the preferred embodiments are equally applicable to position estimation systems and to search mode. Depending upon the levels of position accuracy, low probability of detection, and/or confidentiality required, communications devices of varying capability can be assembled from the capabilities disclosed, herein, based upon modular architecture. For example, disclosed curve fitting and frequency diversity features need only be included in a communication device if the enhanced location accuracy provided by such features is required. By such modular design, the disclosed technology is capable of supporting the most stringent of military special force requirements, as well as the reduced operational requirements demanded by civilian search and rescue operations.

Referring to FIG. 1, a position estimating system that supports high accuracy search mode 10 includes a "master" mobile communication device or "radio" 12 communicating with four reference communication devices 14, 16, 18 and 20 in support of position estimation operations. As used herein and in the claims, a mobile communication device or mobile radio is any portable device capable of transmitting and/or receiving communication signals, including but not limited to: a handheld or body-mounted radio; any type of mobile telephone (e.g., analog cellular, digital cellular or satellite-based); a pager or beeper device; a radio carried on, built into or embedded in a ground-based or airborne vehicle; or any portable electronic device equipped with wireless transmission and reception capabilities, including multimedia terminals capable of transmitting audio, video and data information.

Each of reference radios 14, 16, 18 and 20 can be any radio located at a known position that is capable of communicating with the master radio 12 in the manner described herein to convey position and range-related information. For example, one or more of the reference radios can be a beacon-like radio fixedly mounted in a known location, such as on a tower or building. One or more of the reference radios can also be a mobile radio capable of determining its position from others sources, such as from reception of global position system (GPS) signals or from being presently located at a surveyed position whose coordinates are known and entered into the radio (the reference radios are not themselves GPS satellites). Finally, as explain in greater detail below, one or more of the reference radios relied upon by a particular master radio can be another mobile communication device similar or identical to the master radio, wherein the reference radio determines its own position in accordance with the technique of the present invention (in this case, the "reference" radio functions as both a reference radio for other radios and as its own "master" radio). The fact that each reference radio could potentially be a mobile radio is indicated in FIG. 1 by the designation "(MOBILE)" next to each of reference radios 14, 16, 18 and 20.

Master radio 12 communicates with the four reference radios 14, 16, 18 and 20 to determine its position in three dimensions. Specifically, master radio 12 and each of reference radios 14, 16, 18 and 20 includes an antenna coupled to a transmitter and a receiver for transmitting and receiving ranging pulses. The antenna, transmitter and receiver of each radio may also be used for other communications, such as audio, video and data messages. The time of arrival (TOA) of ranging pulses transmitted between the master and reference radios is used to determine the range to each reference radio, and a conventional trilateration technique is then used to determine from the range measurements the location of the master radio with respect to the reference radios. Each reference radio must know its own position and convey this information to the master radio to enable the master radio to determine its position from the ranging pulses exchanged with the reference radios.

Importantly, the system of the present invention employs a two-way or round-trip ranging message scheme, rather than a one-way TOA scheme, such as those conventionally used to estimate range. As seen from the bi-directional arrows in FIG. 1, master radio 12 transmits to each of the reference radios 14, 16, 18 and 20 outbound ranging pulses or "packets" and receives back from each reference radio a reply ranging pulse. For example, master radio 12 sequentially exchanges ranging pulses with each individual reference radio, first exchanging ranging pulses with reference radio 14, then with reference radio 16, etc.

By precisely knowing the time of transmission of the outbound ranging pulse, the far-end turn around time at the reference radio, the time of arrival of the reply ranging pulse, and internal transmission/reception processing delays, the master radio can precisely determine the signal propagation time between itself and each reference radio. More specifically, the one way signal propagation time or one way time of arrival ($T_{TOA}$) is given by:

$$T_{TOA}=0.5(T_{RTT}-T_{dc\ master}-T_{dc\ reference}-T_{TAT\ reference}+T_{REF\ CF\ offset}+T_{MAS\ CF\ offset}) \quad (1)$$

where $T_{RTT}$ is the total round trip elapsed time from transmission of an outbound ranging pulse to reception of a corresponding reply ranging pulse, $T_{dc\ master}$ is the internal delay in the master radio (determined from delay calibration), $T_{dc\ reference}$ is the internal delay in the reference radio, $T_{TAT\ reference}$ is the reference radio turnaround time, $T_{REF\ CF\ offset}$ is a time offset due to curve fitting the ranging packet data at the reference radio, and $T_{MAS\ CF\ offset}$ is a time offset due to curve fitting the ranging packet data at the master radio.

Although separately represented in equation (1), the accounting for the internal processing delays ($T_{dc\ master}$ and $T_{dc\ reference}$) and adjustments for curve fitting the ranging pulses ($T_{REF\ CF\ offset}$ and $T_{MAS\ CF\ offset}$), described in greater detail hereinbelow, can be considered part of accurately determining the ranging pulses' time of arrival TOA; thus, the one way signal propagation time $T_{TOA}$ can more generally be described as one half of the difference between a) the elapsed time between the time of transmission of the outbound ranging pulse and the time of arrival of the reply ranging pulse and b) the turn around time $T_{TAT}$. To simplify the messaging scheme and computation of the propagation time, the turn around time $T_{TAT}$ can be made constant simply by having the reference radio transmit the reply ranging pulse at a fixed amount of time after the time of arrival of the outbound ranging pulse.

Once the two-way signal propagation time is determined, the range is then readily calculated as the velocity of the signal through the propagating medium (e.g., the speed of light through air) multiplied by the one-way propagation time, or $$\text{Range}=C \times T_{TOA} \quad (2)$$

where C is the speed of light ($2.998 \times 10^8$ m/sec). By determining the range to each of four reference radios in this manner, the master radio can determine its own location from these ranges and the known locations of the reference radios using well-known trilateration computations.

Note that the time of transmission of the outbound ranging pulse is known by the master radio in its own time reference frame. Likewise, the time of arrival of the reply ranging pulse is known by the master radio in its own time reference frame. The turn around time ($T_{TAT}$) is an absolute time duration, unrelated to a particular timing reference of any local clock. That is, the turn around time (which can be a fixed period of time) is determined by the reference radio as the difference between the time of transmission of the reply ranging pulse transmitted by the reference radio and the time of arrival of the outbound ranging pulse at the reference radio. While the time of arrival and time of transmission at the reference radio are determined in the time reference frame of the reference radio's local clock, the resulting time difference ($T_{TAT}$) is independent of the reference time frame of the reference radio. In fact, as previously mentioned, the turn around time can be made constant by transmitting the reply ranging pulse a fixed period of time after arrival of the outbound ranging pulse. Thus, the round trip propagation time can be determined by the master radio in its own timing reference kept by its local clock without reference to or synchronization with the timing reference of any of the clocks of the reference radios (i.e., system synchronization is not required). In effect, the master radio "starts a timer" when the outbound ranging pulse is transmitted, "stops the timer" when the reply ranging pulse arrives, and then subtracts the turn around time and internal processing delays from the "timer's elapsed time" to obtain the duration of the round-trip signal propagation.

The two-way or round-trip messaging approach eliminates the need to synchronize the local clocks of the master radio and the reference radios to the same timing reference. Consequently, the local clocks can have a relatively low accuracy, thereby reducing system complexity and cost. That is, conventional systems that maintain synchronization of the local clocks need highly accurate clocks (e.g., 0.03 ppm) and periodic synchronization processing to prevent the clocks from drifting relative to each other over time. In contrast, the clocks of the present invention can be accurate, for example, to approximately 1 ppm. As used herein, the term "low accuracy clock(s)" refers to a clock having a low accuracy relative to the accuracy of present state-of-the-art clocks used in time-synchronized systems, specifically, an accuracy in the range between approximately 0.5 ppm and 10 ppm. While the clocks of the present invention will experience significant drift over time, this drifting does not impact system performance, because the system does not rely on synchronization of the clocks. More specifically, the system of the present invention looks at the round trip delay time of signals between the master and reference radios. Even with relatively low accuracy clocks, the instantaneous or short-term drift or variation experienced by the local clocks of the master and reference radios during the brief ranging session are insignificant. Of course, it will be understood that higher accuracy clocks can be used in the communication device of the present invention.

As will be appreciated from the foregoing, the radios of the present invention must be able to accurately determine the time of transmission and the time of arrival of the ranging pulses in order to accurately measure the range between the radios and to accurately estimate the position of the master radio. The present invention includes a number of techniques for accurately determining the true time of arrival and time of transmission, even in the presence of severe multipath interference which conventionally tends to degrade the accuracy of the time of arrival estimate.

Figure 2:
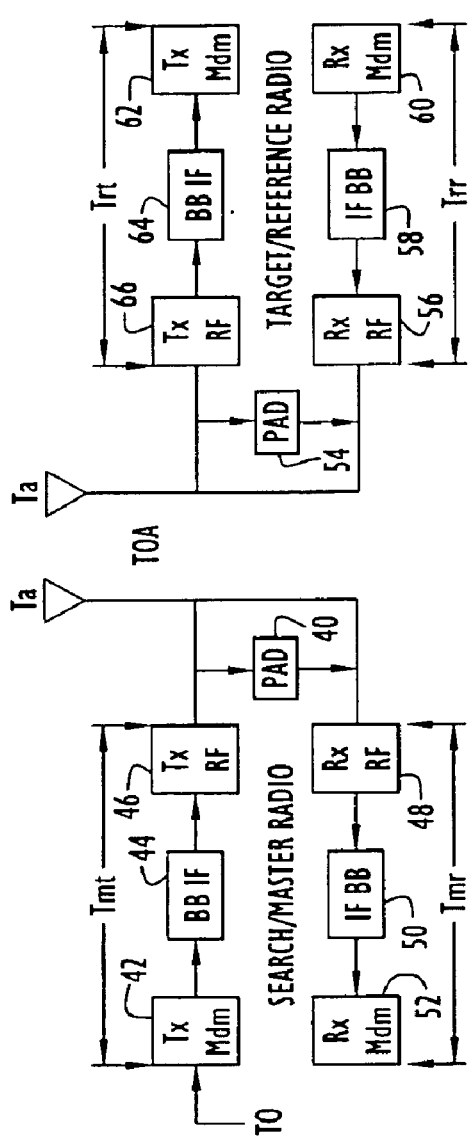
FIG. 2 is a functional block diagram illustrating the internal delay calibration processing performed by a communications device of the exemplary embodiment of the present invention.

As previously explained, asynchronous events occur within each radio which cannot readily be characterized or predicted in advance. These events introduce errors in the radio with respect to knowledge of the actual time of transmission and time of arrival, thereby degrading the accuracy of the range and position estimates. In other words, the time it takes for a signal to be processed within each radio is not constant over time, and to assume that the processing delay has a fixed value introduces inaccuracy in the time of arrival and time of transmission estimates. According to the present invention, to minimize processing delay timing errors resulting from asynchronous events that occur within the signal processors of the radios, each radio performs internal delay calibrations in order to accurately estimate the actual internal processor time delays that occur when processing the ranging pulses. Referring to FIG. 2, the master radio performs an internal delay calibration using a loop back through pad 40 to determine internal signal delays (Tmt+Tmr) in the master radio for correction purposes. The delay Tmt is the master radio transmitter delay. It is the sum of the signal delays through the transmit modem (Tx mdm) 42 where the transmit signal is implemented, the transmit baseband to intermediate frequency (BB-IF) conversion 44, and the transmit radio frequency (Tx RF) analog circuitry 46 of the master radio. The delay Tmr is the master radio receiver delay. It is the sum of the delays through the receive radio frequency (Rx RF) analog circuitry 48 of the master radio, the IF-BB conversion 50, and the receive modem (Rx mdm) 52 where demodulation processing occurs.

Each reference radio also performs an internal delay calibration. Referring again to FIG. 2, the reference radio employs a loop back through pad 54 to determine the reference radio internal delay (Trt+Trr). The delay Trr is the reference radio receiver delay comprising the sum of the delays through the Rx RF analog circuitry 56 of the radio, the IF-BB conversion 58, and the Rx modem 60 where demodulation processing occurs. The delay Trt is the reference radio transmitter delay comprising the sum of the delays through the Tx modem 62, the transmit BB-IF conversion 64, and the Tx RF analog circuitry 66 of the reference radio.

The value for the master and reference radio antenna delay Ta (see FIG. 2) is a constant preloaded into the radios and combined with the results of delay calibration to reference the time of arrival to the antenna/air interface. The delay Ta is determined by measuring the delay through a large sample of antennas and cabling, over a range of operating temperatures, and calculating the mean and standard deviation of the measured values. Note that cabling delays for cabling between antenna and electronics are included in the value of Ta.

Thus, the internal processing delay of the master radio ($T_{dc, master}$) seen in equation (1) is determined from the master radio transmitter and receiver delays Tmt and Tmr determined from the calibration process and the estimated antenna delay Ta. Similarly, the internal processing delay of each reference radio ($T_{dc\ reference}$) includes the reference radio transmitter and receiver delays Trt and Trr determined from the calibration process and the estimated antenna delay Ta. The total elapsed time measured by the master radio between transmission of the outbound ranging pulse and reception the reply ranging pulse includes time attributable to propagation of the pulse signals and time attributable to processing delays within the radios. By accurately estimating and subtracting out the time attributable to processing delays, the signal propagation time (and hence the range) can be more accurately determined.

The internal delay calibration performed in the radios of the present invention is one of the keys to getting repeatable accuracy with low resolution clocks. In essence, by sending calibration signals through the same processing used to subsequently transmit the actual ranging pulse, the difficult-to-characterize processing delay variations can be calibrated out to yield a more accurate measurement.

The internal delay calibration in the radios can be performed as often as necessary to ensure a desired degree of accuracy in the internal delay estimation. For example, the calibration can be performed during a ranging session to yield current estimates for the ranging session, or the calibration can be performed periodically, substantially independent of the timing of ranging sessions. Multiple trials can be performed and averaged to reduce the variance of the delay estimate. Where multiple ranging pulses are to be transmitted at different carrier frequencies, trials can be performed at plural frequencies. For example, if the carrier frequencies fall within a frequency band, calibration can be performed in the middle of the band and at each end of the band.

Figure 3:
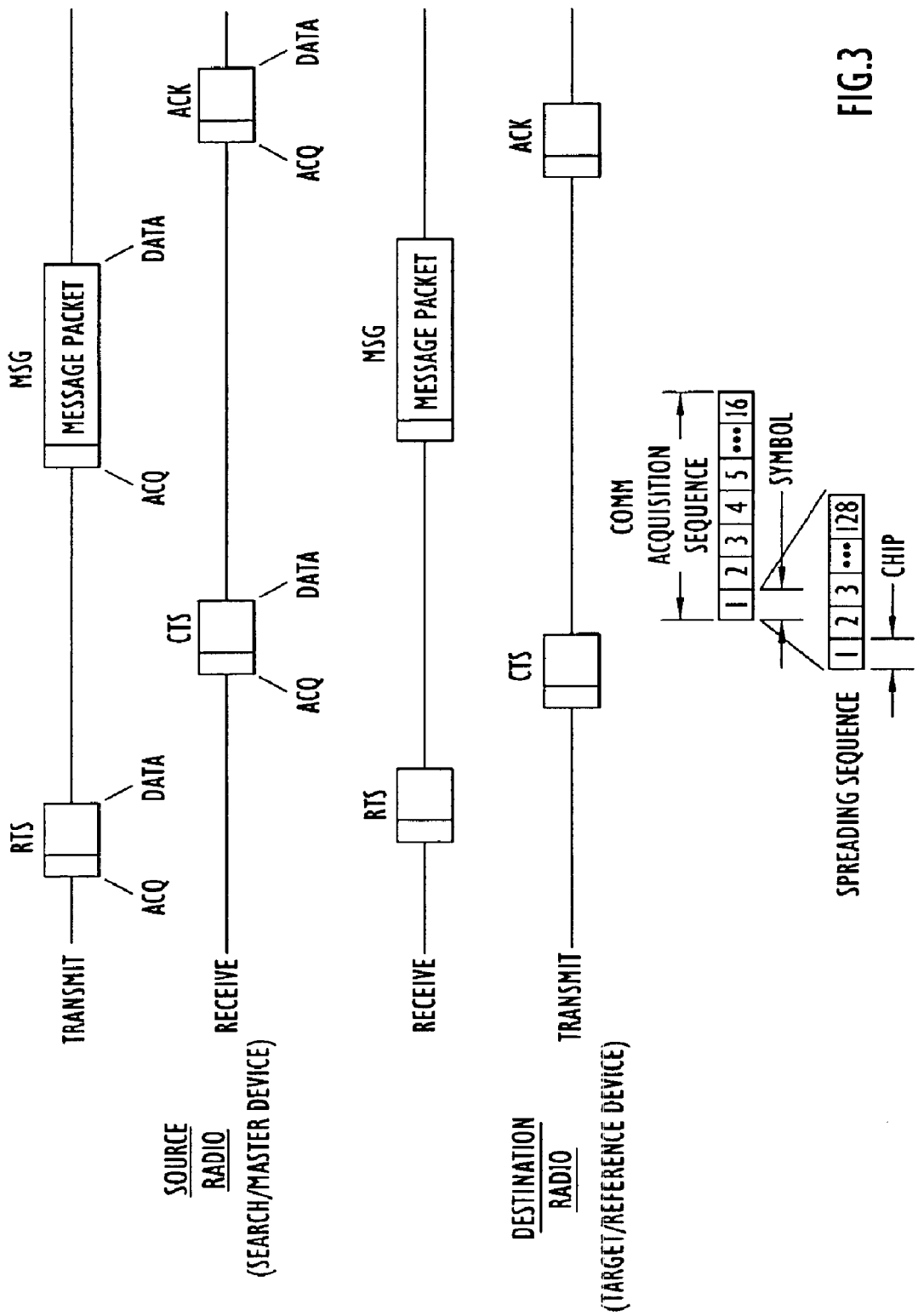
FIG. 3 is a message timing diagram illustrating a typical message exchange in a conventional CSMA/CA protocol.

The following exemplary embodiment of the present invention further illustrates the foregoing aspects of the present invention as well as other features and advantages of the present invention. To take advantage of existing hardware and software found in certain radios, in accordance with the exemplary embodiment, the messaging protocol used for ranging can be derived from the Carrier Sense Multiple Access with Collision Avoidance (CSMA/CA) protocol used by these radios. In conventional CSMA/CA messaging, a network of communication devices share a common communication resource, such as one or more communication channels. The protocol calls for first reserving the channel with an exchange of reservation messages followed by an exchange of the message itself and a corresponding acknowledge message in reply. More specifically, as shown in FIG. 3, a source device attempting to transmit a message to a destination device transmits an initial request-to-send (RTS) message to the destination device to notify the destination device and any other network devices sharing the channel of the source device's request to use the channel to transmit the message. If the RTS message is successfully received by the destination device and the channel is available, the destination device replies to the source device with a clear-to-send (CTS) message. Upon receiving the CTS message, the source device transmits to the destination device an information message (MSG) containing, for example, audio, video and/or data. If the information message is successfully received, the destination device transmits an acknowledge (ACK) message back to the source device, thereby concluding the message exchange.

Each RTS, CTS, MSG and ACK message comprises an acquisition portion followed by a data portion. As shown in FIG. 3, the acquisition portion of the waveform begins with a communication acquisition sequence (comm. acquisition) comprising sixteen 4 $\mu$s symbols with 128 chips each.

The basic CSMA/CA messaging scheme and the associated radio hardware and software required to handle CSMA/CA messages can be employed to transmit ranging pulses required to accurately determine the round-trip signal delay between pairs of mobile communication devices. For example, the RTS message can be adapted to notify the network of a master radio's request to reserve a communication channel for a period of time sufficient to complete a ranging session (i.e., exchange a sequence of ranging pulses), and the CTS message can be adapted to reply to the modified RTS message to indicate that the reference radio is prepared to receive the ranging pulses. Further, the acquisition portion of the CSMA/CA waveform can be employed in the ranging pulses themselves to facilitate reception of ranging pulses using hardware and software designed to receive conventional CSMA/CA messages.

Figure 4:
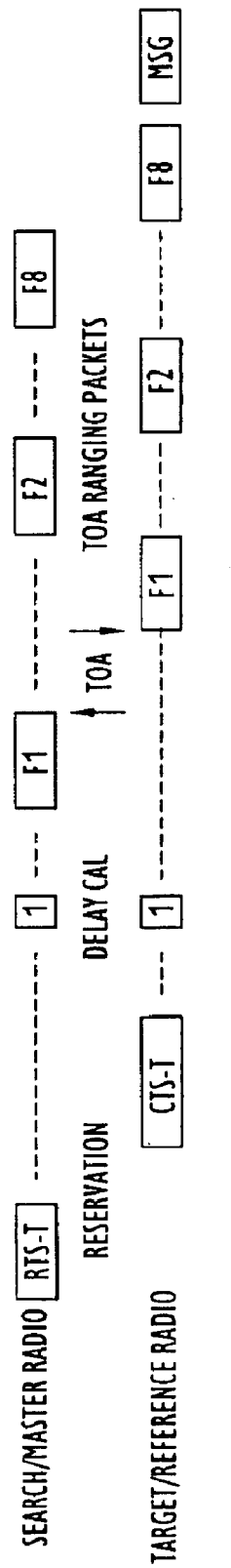
FIG. 4 illustrates a ranging pulse exchange sequence performed by a search communication device and the target communication device during a ranging session in accordance with an exemplary embodiment of the present invention.

The TOA ranging protocol to a single reference in accordance with the exemplary embodiment is shown in FIG. 4. Like channel reservation in a system employing a CSMA/CA protocol for conventional communications, the master radio initiates the time of arrival (TOA) ranging session by transmitting a channel reservation request message RTS-T requesting access to a communication channel for a period of time required to exchange a sequence of ranging pulses with a particular reference radio (the ranging process is repeated with each reference radio in sequence). By way of example, the RTS-T can be a modified RTS message which includes a bit set in the data field indicating the time of arrival (TOA) ranging mode rather than a standard communication session set up by a conventional request-to-send message. The master radio also sets a "delay calibration" bit in the RTS-T message if a delay calibration has not been performed during a predetermined preceding time period (e.g., no delay calibration has been performed in the past fifteen minutes). This bit alerts the reference radio that the master radio will perform a delay calibration after the reservation is set up using a single internal loop back with the TOA ranging signal in the middle of the ranging band. If neither radio needs to perform a delay calibration, the exchange of ranging pulse starts immediately after the reservation process is complete.

In accordance with the exemplary embodiment, the master radio transmits the RTS-T message to prompt a particular reference radio to perform internal delay calibration and to initiate a sequence of ranging message exchanges at multiple transmission frequencies. The reference radio receives the RTS-T message and reads the TOA data bit. If the requested channel is available, the reference radio transmits a reply reservation message (CTS-T) back to the master radio indicating that the channel is available and the reference radio is ready to exchange ranging pulses with the master radio, thereby completing the reservation for ranging. The reference radio also sets the "delay calibration" bit in the CTS-T if a delay calibration has not been performed in a predetermined preceding time period. This bit alerts the master radio that the reference radio will perform a delay calibration after the reservation is set up using a single internal loop back with the TOA ranging signal in the middle of the ranging band.

The RTS-T and CTS-T messages can also include a data portion for conveying information required by the master and reference radio to perform the ranging operation. For example, a destination address field can be used to indicate the destination radio to which a source radio (i.e., the master or reference radio) is directing the subsequent ranging pulses. The data portion of the message can also include information such as the identification of the transmitting radio, a flag or data indicating a ranging mode, or information relating to the state of multipath interference.

Once the master radio and reference radio have exchanged the RTS-T and CTS-T messages and, if necessary, performed delay calibration, the master radio and reference radio exchange a sequence of ranging pulses in rapid succession, with each set of exchanged pulses being transmitted at a different carrier frequency. Diverse frequencies create diverse carrier phases in multipath. Ranging performance is best when the carrier phase of the multipath is 90° with respect to the direct path. If this orthogonality condition is met, the direct path and multipath are separated such that the time of arrival of the direct path pulse can be more precisely determined by curve fitting with minimal effects from multipath. The multiple transmission carrier frequencies can be referred to as "ping" frequencies and the ranging pulses can be referred to as "TOA pings", since a rapid succession of M different frequency pulses or multiple "pings" are transmitted between the radios in search of an optimal frequency.

The TOA ranging waveform is preferably operated in the frequency band from approximately 225 MHz to 2500 MHz and, more preferably, the carrier frequencies for ranging are in the band from approximately 225 MHz to 400 MHz. Due to propagation effects, bandwidth limitations, and effects of wavelength on the Quadrature Multi-Frequency Ranging (QMFR) algorithm described herein, ranging accuracy can be expected to degrade outside of the band from approximately 225 MHz to 400 MHz.

Referring again to FIG. 4, the master radio transmits a first outbound ranging pulse or TOA ping using a first transmission frequency F1. The reference radio receives the first outbound ranging pulse and transmits a first reply ranging pulse to the master radio at the first transmission frequency F1. The reference radio, recognizing that these are ranging packet exchanges, uses a precise, programmable, turnaround time (TAT) from reception of the master ranging packet to transmission of the reference ranging packet back to the master radio.

After receiving the first reply ranging pulse, the master radio transmits a second outbound ranging pulse at a second transmission frequency F2. The master radio also uses a precise, programmable, turnaround time from reception of the reference ranging packet to transmission of the next master ranging packet back to the reference radio, allowing relative TOA at the reference to be used in the processing for determining TOA and range. The reference radio replies to the second outbound ranging pulse with a second reply ranging pulse at the second transmission frequency F2. This process is repeated until ranging pulses have been exchanged for each of eight frequencies F1 through F8 (i.e., an exchange of eight sets of TOA pings). In this manner, the eight sets of ranging pulses are transmitted at eight different carrier frequencies. For example, the first set of ranging pulses uses the carrier frequency Fc, while each following ranging packet increases the carrier frequency by 2.15 MHz. For ranging packet eight, the carrier frequency is at Fc+15.05 MHz. These are the ranging signals that are used to compute the TOA. The TOA is then used to compute the range between the master and reference radios. Intervening delay calibrations and GPS data are not required due to the rapid rate at which these packets are exchanged.

After all eight sets of ranging pulses have been exchanged, the reference radio precisely determines the time of arrival of the ranging pulses, as described below, and send a final message packet (MSG) to the master radio (see FIG. 4). The MSG packet, transmitted at carrier frequency Fc+15.05 MHz from the reference radio to the master radio contains the following data: reference radio delay calibration ($T_{dc\ reference}$); curve fit offset due to curve fitting the ranging packet data at the reference radio ($T_{REF\ CF\ offset}$); the best carrier frequency found by the reference radio (the carrier frequency at which the multipath error is most orthogonal);

an estimate of the accuracy of the TOA estimate from curve fitting (quality of fit (QOF)); the reference radio position and position accuracy (e.g., latitude, longitude, altitude, and spherical position standard deviation); and the reference radio velocity and velocity accuracy (e.g., east, north, up and spherical velocity standard deviation). This position and velocity information can be known from the fact that the reference radio is in a location whose coordinates are known, from GPS signals received and processed by the reference radio, or by employing the technique of the present invention by ranging from beacon-like radios or other mobile radios. Each master device will retain, to the degree practical based upon available memory limitations and storage requirements, historical position and position accuracy information received from each reference device with which it interacts as well as information pertaining to its own calculated position.

Once the ranging sequence is completed with one reference radio, the processes is repeated with another reference radio. In general, to accurately determine the master radio's position in three dimensions, it is necessary to determine the range to at least four reference radios, although range measurements to fewer than four reference radios can be used to update position estimates with some degree of degradation. The master radio will cycle between the M reference radios being used for the particular ranging solution. The value of M can vary from four to ten, for example. Reasonable cycle times are one to ten seconds. If ten reference radios are used with a cycle time of one second, for example, the master radio will perform the ranging protocol every 100 ms as it cycles through the 10 reference radios. If four reference radios are used with a cycle time of 10 seconds, the master radio will perform the ranging protocol in every 2.5 seconds.

Figure 5:
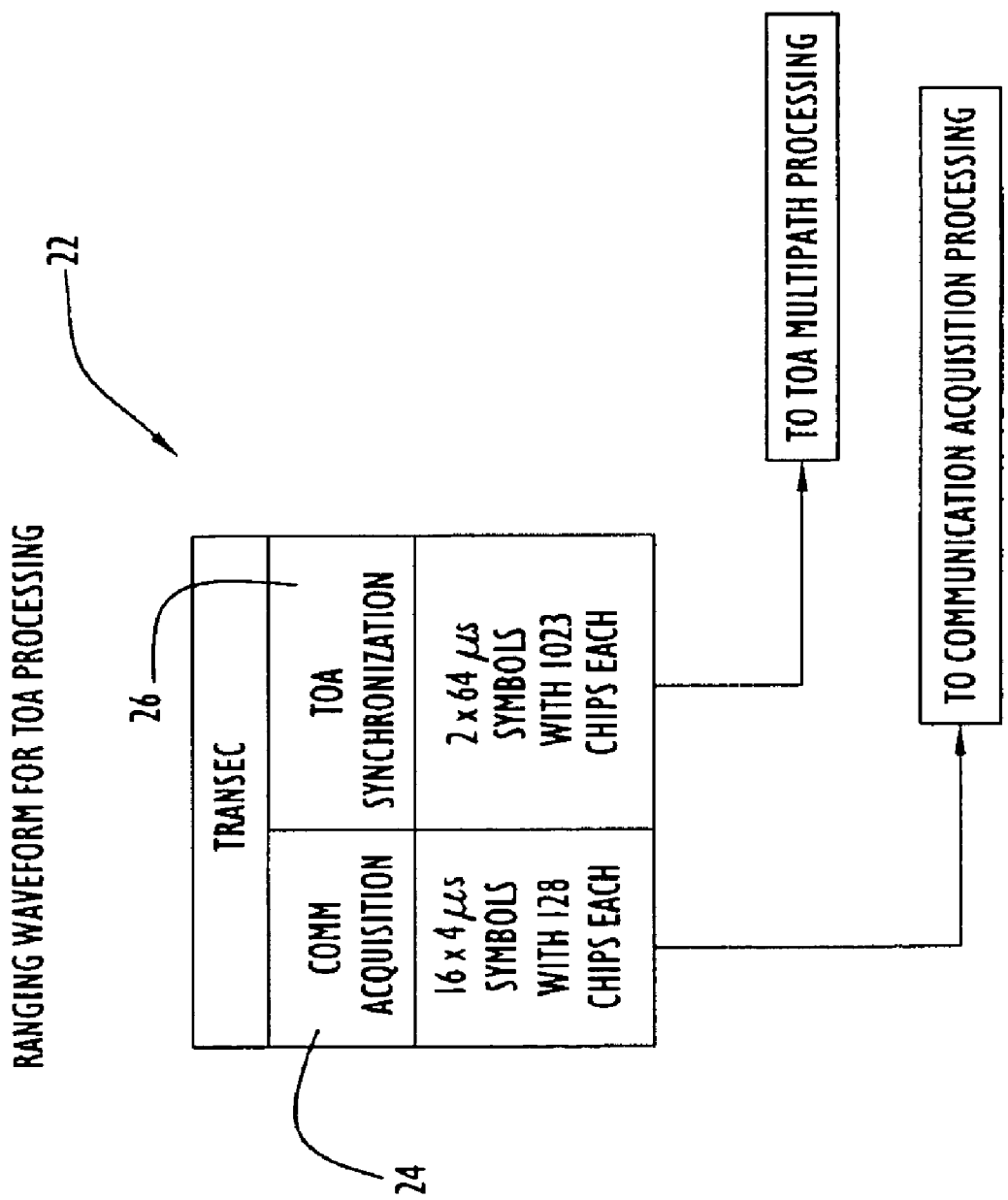
FIG. 5 illustrates the structure and contents of a ranging pulse in accordance with an exemplary embodiment of the present invention.

An example of a range pulse waveform 22 adapted for accurately determining the time of arrival is shown in FIG. 5. The waveform begins with a communication acquisition sequence (comm. acquisition) 24 comprising sixteen 4 $\mu$s symbols with 128 chips per symbol. In this example, the communication acquisition sequence is the same as the communication acquisition sequence in a conventional waveform of the CSMA/CA protocol. Consequently, existing hardware and software in the receiver of the reference radios of the exemplary embodiment can be used to detect the arrival of the TOA ranging pulse. The waveform also includes a time of arrival (TOA) synchronization sequence 26 comprising two, 64 $\mu$s symbols with 1023 chips per symbol (a total of 2046 chips). As described in greater detail, below, the TOA synchronization sequence is used in conjunction with the communication acquisition sequence to accurately determine the time of arrival of each TOA ping. The acquisition sequence is used by the receiving device to acquire and synchronize with the received message waveform. It will be appreciated that the communication acquisition sequence and the TOA synchronization sequence of the present invention are not limited to the particular waveform described in the exemplary embodiment, and the number and length of the symbols of the communication acquisition sequence and the TOA synchronization sequence can be set to any values suitable for acquiring and processing the ranging waveform in accordance with operational requirements, such as specified probabilities of false alarm and detection and accuracy of the time of arrival estimate.

The ranging operation of the present invention can be employed in a communication system without disruption of audio, video and/or data information also conveyed by the system. For example, the ranging scheme can be seamlessly incorporated into a system employing a CSMA/CA protocol to convey such information. Of course, it will be understood that the messaging scheme of the present invention is not limited to any particular protocol, and any suitable message or signal structure that permits transmission of an outbound ranging pulse and a reply ranging pulse can be used to implement the present invention.

Another aspect to accurately determining the range between the master radio and each of the reference radios is the precise estimation of the time of arrival of the outbound ranging message at the reference radio and the time of arrival of the reply ranging message at the master radio. In accordance with another aspect of the present invention, the timing of the leading edge of a synchronization sequence of the ranging message is accurately determined by assessing and avoiding multipath interference which can degrade the accuracy of the time of arrival estimate. In particular, a two-stage signal acquisition scheme is employed using the communication acquisition sequence and the TOA synchronization sequence of the ranging messages. Detection of the communication acquisition sequence is used to trigger acquisition of the TOA synchronization sequence in which the time of arrival is precisely estimated.

Figure 6:
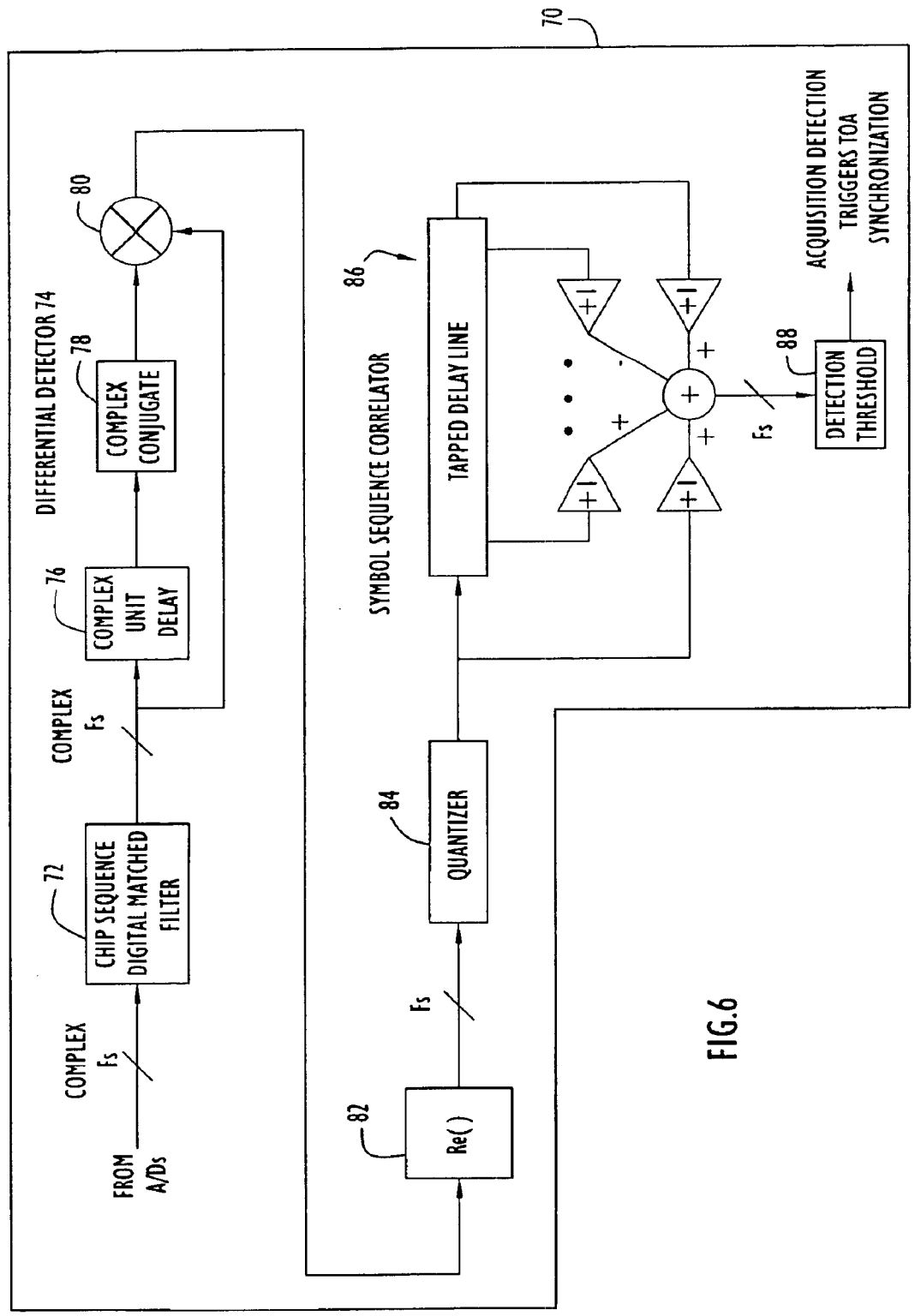
FIG. 6 is a functional block diagram illustrating the acquisition processing employed to detect the communication acquisition sequence of the ranging pulses.

A functional block diagram illustrating acquisition of the communication acquisition sequence of the spread spectrum ranging message at each radio is shown in FIG. 6. After analog-to-digital (A/D) conversion, the communication acquisition sequence in the form of a spread spectrum complex signal is processed to provide time synchronization for the modem of the reference radio. Specifically, the acquisition detection processing employs digital matched filtering and Barker code correlation to detect the transmitted communication acquisition waveform and to derive the required timing information. By way of example, the communication acquisition processor 70 can be configured to meet the following operational requirements: probability of detection=99.5%, probability of false alarm=$10^{-6}$, and time of detection determined to ¼ of a chip.

The communication acquisition processor 70 includes digital matched filter (DMF) 72 (N=128) having coefficients that are matched to the length 128 PN sequence that is chipping each of the sixteen, 4 $\mu$sec comm. acquisition symbols. The DMF 72 de-spreads each of the symbols and provides a peak response when aligned with each symbol. The PN sequence can be identical for each of the sixteen segments. The DMF 72 can be clocked, for example, at 32 MHz, thereby yielding 128 coefficients for the inphase (I) filter section and 128 coefficients for the quadrature (Q) filter section. The DMF coefficients can be programmable.

A differential detector 74 compares the phase of the received signal between two successive symbol intervals. More specifically, differential detector 74 includes a complex delay unit 76 which delays the output of DMF 72 by a symbol interval, a complex conjugate unit 78 which forms the complex conjugate of the delayed signal, and a comparator 80 which receives the output of DMF 72 and the delayed complex conjugate of the output of DMF 72 and produces the differential detector output. The decision variable is proportional to the phase difference between these two complex numbers, which, for BPSK, can be extracted from the real part of the differential detector output (see block 82).

The real portion of the differential detector output is quantized in quantizer 84 and supplied to a symbol sequence correlator 86, such as a Barker code correlator. The output of the Barker code correlator is compared to a detection threshold 88. If the detection threshold is exceeded, a communication detection is declared.

This first stage of the two-stage signal acquisition processing (i.e., detection of the communication acquisition sequence) is the same as the processing used to detect the communication acquisition sequence of a conventional message in the CSMA/CA protocol, thereby allowing existing hardware and software to be used. The communication acquisition processor 70 treats the communication acquisition sequence as a sequence of 16, 128 chip symbols and therefore employs a relatively short matched filter (N=128), resulting in a modest amount of processing. This modest processing load is desirable, since the receiver must continuously perform this processing to detect the communication acquisition sequence (whose arrival time is not known apriori).

While the detection result of the communication acquisition process can be used to estimate the TOA of the ranging pulse (i.e., a one-stage TOA estimation process), a more accurate estimate can be obtained by processing a longer symbol with a longer matched filter. However, continuously running a longer matched filter would require excessive processing. Accordingly, the system of present invention employs a two-stage process, wherein detection of the communication acquisition sequence triggers a second stage in which a longer acquisition symbol is processed with a longer matched filter (i.e., TOA synchronization processing). This additional processing is required only over a limited period of time identified by detection of the communication acquisition sequence, thereby avoiding excessive processing.

Figure 7:
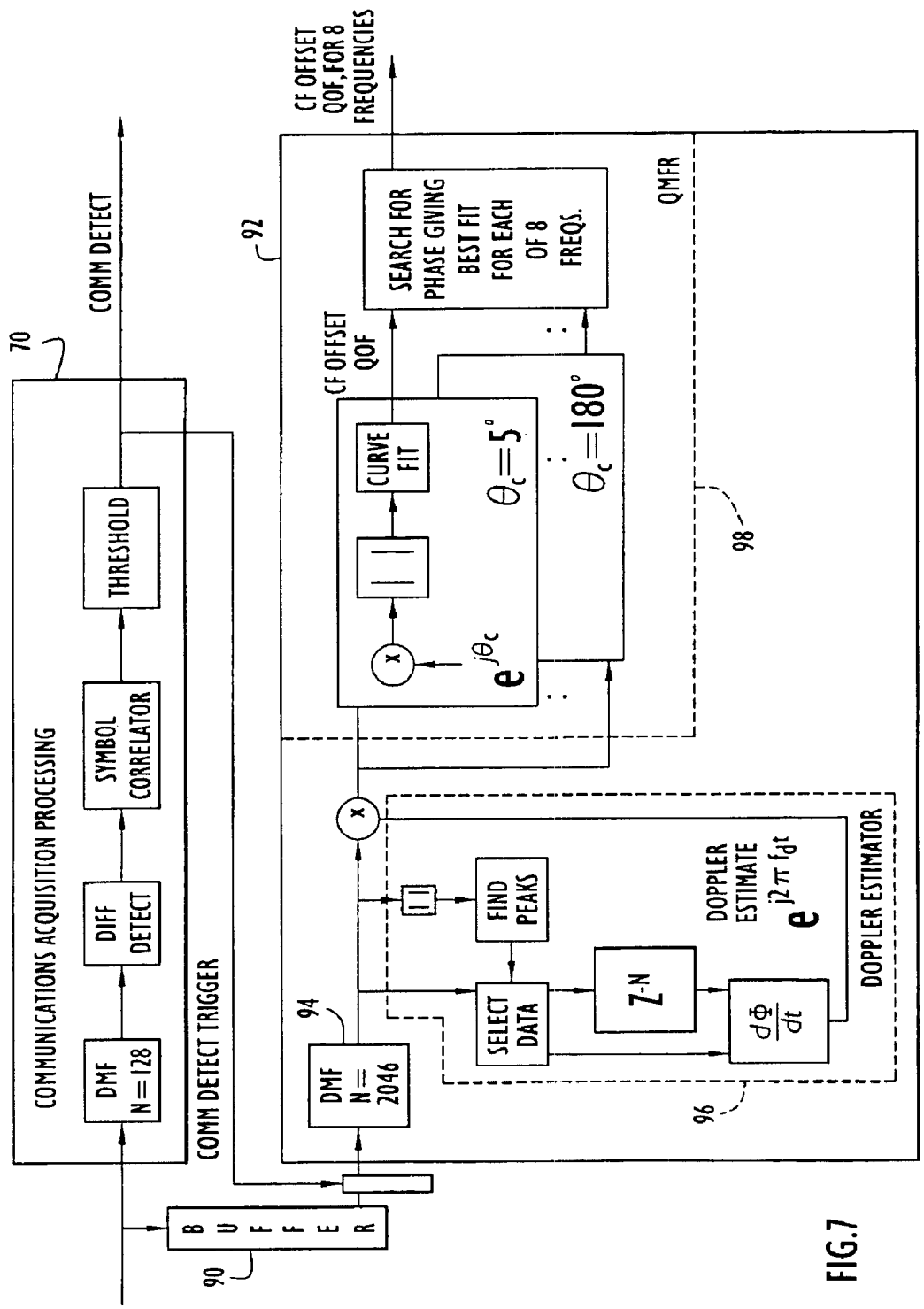
FIG. 7 is a functional block diagram illustrating the processing performed by a reference radio of the exemplary embodiment of the present invention to determine the time of arrival of a ranging pulse, involving doppler estimation and evaluation and separation of multipath interference from the direct path signal.
Figure 8:
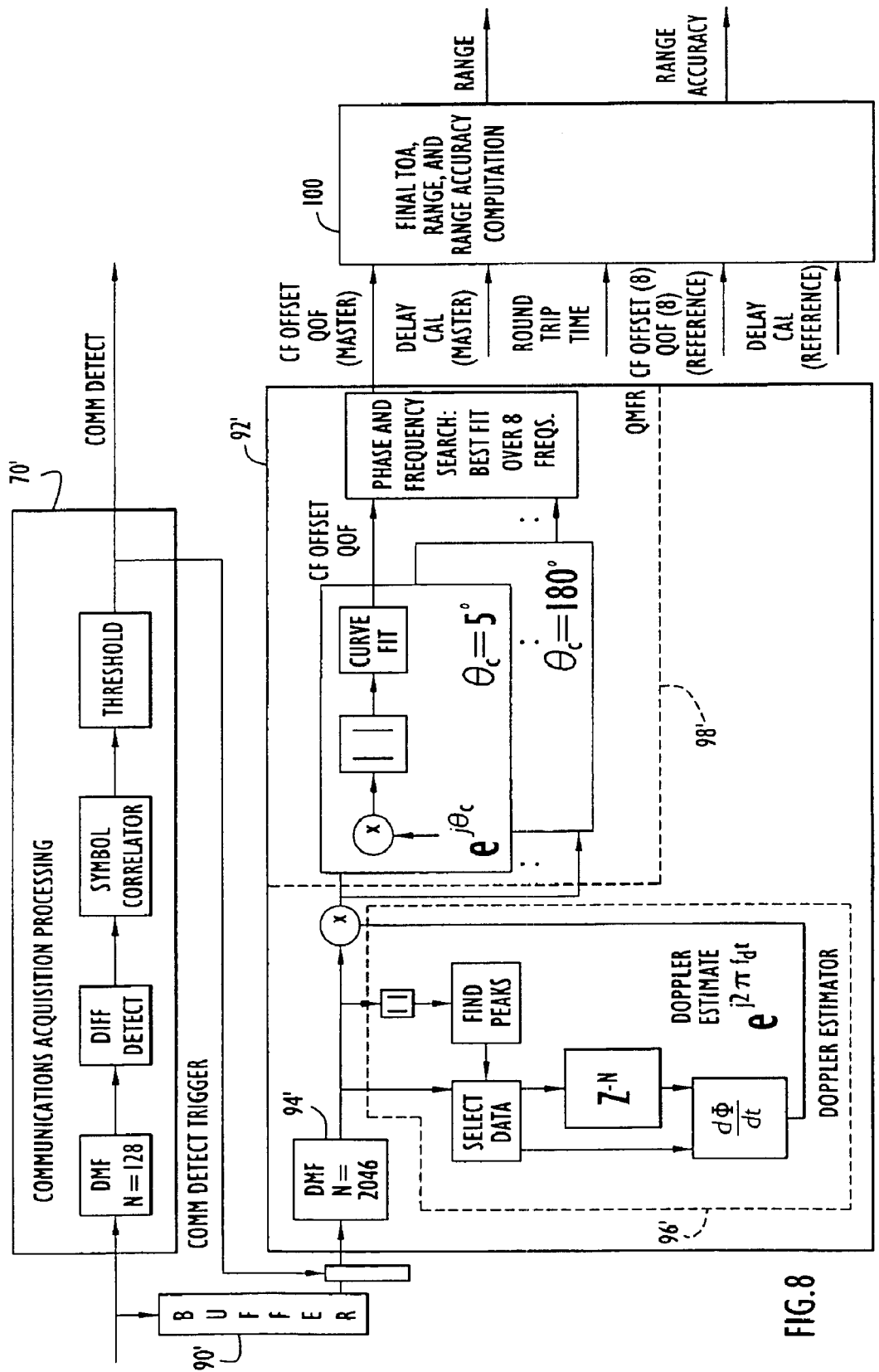
FIG. 8 is a functional block diagram illustrating the processing performed by the master radio of the exemplary embodiment of the present invention to determine the time of arrival of a ranging pulse, involving doppler estimation and evaluation and separation of multipath interference from the direct path signal.

The TOA estimation processes in a reference radio and in the master radio in accordance with the exemplary embodiment of the present invention are respectively shown in FIGS. 7 and 8. Once a ranging session has been set up from the reservation channel exchange, the reference radio responds to each ranging pulse or "packet" by automatically transmitting a reply ranging pulse at the same carrier frequency after a known, programmable, delay called the turn-around time (TAT). After receiving the ranging pulse from the reference, the master radio tunes to the next carrier frequency and transmits the next ranging pulse at the next carrier frequency after the turn-around time delay. This process is repeated until the eighth and final ranging pulses are transmitted and received.

Upon reception of each of the eight ranging pulses (at frequencies F1 through F8), detection of the communications acquisition sequence of the ranging pulse will trigger a buffer 90 to capture samples of the TOA synchronization sequence from the ranging pulse. The reference radio begins TOA processing once the data from all eight pulses of the ranging session have been captured. Processing begins with the data from the first (F1) ranging pulse. Referring to FIG. 7, in order to accurately determine range and position for rapidly moving mobile communication devices, such as those onboard moving vehicles, the TOA processor 92 determines and compensates for the Doppler effect experienced between master and reference radios in relative motion. Specifically, the buffered 2046 chip TOA synchronization sequence is supplied to a digital matched filter 94 (N=2046). The output of the digital matched filter is then supplied to a Doppler Estimator 96.

In the Doppler estimator 96, twenty-four samples are computed around the expected digital matched filter output peaks of each of the TOA symbols. The twenty-four samples include the peak sample, twelve samples before the peak, and eleven samples after the peak. These samples are used in a clock drift/Doppler offset calculation by first computing their magnitude and locating the peak samples. The peak output of the TOA digital matched filter from the first TOA synchronization sequence will be 75.9375 $\mu$sec (2430 samples assuming the late window is 384 samples) after the Barker correlator peak from processing the communications acquisition sequence. The two TOA peaks correspond to the midpoint samples of each of the TOA synchronization symbols and are 63.9375 $\mu$sec (2046 samples) apart. The Doppler is estimated by determining the change in phase over the 64 $\mu$sec symbol time by comparing the symbols. Specifically, one symbol is delay by the duration of a symbol (represented by $z^{-N}$ in FIG. 7) and compared to the second un-delayed symbol. The 24 complex samples corresponding to the digital matched filter output for the second TOA synchronization symbol are then rotated by the estimated Doppler shift $e^{j2\pi f dt}$ and used for the remaining TOA processing. The twenty-four Doppler-corrected, complex samples from each carrier frequency are supplied to the Quadrature Multi-Frequency Ranging (QMFR) processor 98.

The Quadrature Multi-Frequency Ranging (QMFR) processor 98 employs frequency diversity to identify an optimal transmission frequency and phase that minimize multipath interference. Diverse frequencies create diverse carrier phases in multipath. Ranging performance is best when the carrier phase of the multipath is 90° with respect to the direct path. If this orthogonality condition is met, the direct path and multipath are separated such that the direct path can be more precisely curve fit with minimal effects for multipath.

Referring again to FIG. 7, in the reference radio, the Doppler-compensated matched filtered signal received by the QMFR processor 98 is supplied to a bank of phase rotators which rotate the phase of the signal by evenly spaced increments up to one-hundred and eighty degrees. For example, the bank can include thirty-six phase rotators which respectively rotate the signal in 5° increments through 180° (i.e., 5°, 10°, 15°, . . . , 175°, and 180°). By evaluating the signal at each of these phase rotations, a phase rotation that provides the best separation between the multipath signal and the direct path signal for the particular carrier frequency can be identified.

After performing a magnitude function on each phase-rotated signal, a curve fit is performed. Essentially, a replica of the TOA synchronization sequence's multipath-free correlation function out of the matched filter is stored pre-stored (i.e., the multipath-free pulse shape profile is known). The curve fitting involves moving the pulse shape replica through the profile of the phase rotated output of the matched filter and performing a least-mean-square error fit to achieve a curve fitting between the replica pulse shape and the matched filter output to identify the timing of the direct path signal and subsequent multipath signals (at the time of the direct path signal and the multipath signal, the matched filter profile will be similar to the replica profile).

The QMFR processor 98 searches the curve-fit data from each phase rotation to locate the best curve fit. The best curve fit (CF) occurs where the multipath and direct path are orthogonal (90° out of phase). Specifically, the data is searched to find the phase where the optimal pulsewidth occurs at the carrier phase with the shortest path delay. Essentially, the processor identifies the phase at which the direct path signal and the nearest multipath signal are most nearly orthogonal and the timing accuracy of the signal curve fit can be expected to be highest. The curve fitting error provides the quality of fit (QOF) metric that is saved along with the CF offset from the nearest sample time.

The phase rotation process and best curve fit evaluation is repeated for the received ranging message at each of the carrier frequencies, such that a set of phase rotated signals is generated for each ranging message carrier frequency. Thus, after receiving and processing all of the ranging messages, an array of curve-fit ranging signals at different frequencies and phases has been developed and evaluated. For example, with ranging pulses at eight different carrier frequencies, each being processed through thirty-six phase rotators, a total of two-hundred and eighty-eight TOA ranging signals are generated. For each of the eight carrier frequencies, the phase of the TOA signal yielding the best multipath discrimination (best QOF) is identified. In effect, a search is conducted in two dimensions (frequency and phase) to identify for each frequency the phase which best separates multipath signals and minimizes interference therefrom.

The CF offset associated with the best QOF for each of the eight ranging pulses (at frequencies F1–F8), along with the eight corresponding QOFs themselves, are sent to the master radio in the final message packet (MSG) of the ranging session, where one of the CF offsets is used, in effect, to refine the value of the reference radio TAT. The master radio uses the selected reference radio QOF metric, along with the selected master radio QOF, to compute a range accuracy estimate.

As seen in FIG. 8, the TOA processing performed by the master radio is similar to that performed by the reference radio (reflected by use of the numerals 70', 90', 92', 94', 96' and 98'); however, the master radio also employs information determined from the reference radio's TOA processing and supplied to the master radio in the final message packet (MSG) of the ranging sequence, including: the reference radio curve-fit timing offset and quality of fit at the carrier frequency determined to be best by the master radio, and the delay calibration of the reference radio.

Specifically, in the QMFR processor 92', the master radio generates the CF offset and QOF at each of the thirty-six phases for each of the eight reply ranging pulses. QMFR processor 92' then searches in frequency and phase for the curve fit at which the direct path and multipath signals are most orthogonal. After searching the thirty-six phases at each carrier frequency for the best curve fit, the master radio performs the final TOA range and range accuracy computation (block 100). The master radio uses the CF offset, QOF and delay calibration from the reference radio at the frequency determined by the master radio to provide the best QOF, along with the total round trip time (RTT), the estimated CF offset of the reference-to-master radio ranging packet acquisition detection, and the master radio delay calibration to compute the final TOA and range estimates in accordance with equations (1) and (2).

Estimates of the curve fit accuracy at the reference and master radios, determined from the reference and master QOFs, are used to determine a range accuracy estimate. The estimated range and range accuracy are supplied to a navigation system (not shown) which tracks the location solution of the master radio using, for example, Kalman filtering techniques.

Note that the TOA synchronization sequence is not strictly required by the system of the present invention; the receiver can directly use the communication acquisition sequence to evaluate multipath interference and curve fit to determine the leading edge of the signal. For example, the communication acquisition sequence can be continuously buffered and, upon detection, a longer matched filter (N=2048) treating the communication acquisition sequence as one long symbol can be used to perform the TOA estimation. In this case, the relatively rough estimate of the TOA provided by the communication acquisition processing can be used to limit the time range over which the TOA processor match filters the communication acquisition sequence with the 2048 length matched filter. The TOA processing is otherwise similar to the TOA processing shown in FIGS. 7 and 8. However, a more precise estimate can be obtained using the TOA synchronization sequence described above.

While a particular implementation of the TOA processing has been described in conjunction with FIGS. 7 and 8, it will be understood that other implementations and variations in the TOA processing scheme fall within the scope of the invention. For example, schemes which perform different degrees of processing based upon specified accuracy levels can be employed, such as those described in U.S. patent application Ser. No. 09/365,702, entitled "Method And Apparatus For Determining The Position of a Mobile Communication Device Using Low Accuracy Clocks," filed Aug. 2, 1999, the disclosure of which is incorporated herein by reference in its entirety. For example, if a high accuracy TOA mode is selected, the radios can automatically employ frequency diversity without first evaluating at a first frequency whether multipath interference is substantial, and a single ranging message exchange (no frequency diversity) can always be used in a lower accuracy TOA mode.

The master radio determines its own position from the measured range to each of the reference radios via a trilateration technique which can be for example, a conventional trilateration technique. Once the master radio's position has been determined, the master radio can convey this information to other radios or to a controller or coordinator performing tracking and/or mapping of the master radio and perhaps other associated mobile radios. The ranging/position location processing can be performed periodically or initiated by the master radio or a system controller as needed.

As will be understood from the above description, the mobile communication device allows the location estimating system of the present invention to be self-healing. That is, in situations with a number of mobile radios, each mobile radio may be able to serve as both a master radio to determine its own position and as a reference radio for other mobile radios. Thus, when a particular mobile radio cannot receive adequate ranging signals from a current set of reference radios, the mobile radio can alter the set of reference radios to include mobile radios whose ranging signals are acceptable. For example, a first mobile radio may be relying on four reference radios that are fixed or GPS-based. A second mobile radio may be positioned such that the signal strength from one of the fixed or GPS-based reference radios is too weak or the positional geometry is such that the four fixed/GPS-based reference radios do not provide accurate three-dimensional information (e.g., two are along the same line of sight). In this case, the second mobile radio can use the first mobile radio as one of the reference radios if this provides better results. This flexibility is in contrast to conventional systems where the mobile radios must rely on fixed transmitters for reception of ranging signals and cannot range off of other mobile radios to determine position.

As previously stated, the techniques addressed in this discussion of the preferred embodiments are equally applicable to location estimation systems and to search mode. Depending upon the levels of position accuracy, low probability of detection, and/or confidentiality required, communications devices of varying capability can be assembled from the capabilities disclosed, herein, based upon modular architecture. For example, disclosed curve fitting and frequency diversity features need only be included in a communications device if the enhanced location accuracy provided by such features is required. By such modular design, the disclosed technology is capable of supporting the most stringent of military special force requirements, as well as the reduced operational requirements demanded by civilian search and rescue operations.

When discussing trilateration-based location estimation systems, a "master" device is any communications device that is attempting to execute ranging techniques in order to calculate its position in three dimensions relative to "reference" communications devices of known location. Communications devices employed in the system will serve as a "master" device when trying to ascertain it's own location in this manner. Communications devices employed in the system will serve as a "reference" device when being communicated with by a "master" device in this manner. When discussing ranging techniques in support of the high accuracy search mode capability, a "search" device that uses ranging techniques to determine its distance from a "target" device for homing purposes employs the same ranging techniques used by a "master" device that uses ranging techniques to determine its distance from each of several "reference" devices in order to calculate its position based upon trilateration. Communications devices employed in the system will serve as a "search" device when trying to determine its distance from a "target" in this manner. Communications devices employed in the system will serve as a "target" device when being communicated with by a "search" device in this manner.

FIG. 1 presents a location estimating system that supports the high accuracy search mode capability, consisting of one master device, and four reference devices. Multiple reference devices are indicated because in order to calculate its location using ranging techniques and trilateration based calculations, a master device requires accurate range measurements from multiple reference devices of known location. To support the subsequent high accuracy search mode, however, only two devices are required. When operating in search mode, the "search" device acts as a position estimation system "master" device, issuing TOA ping sequences and employing the same ranging techniques used to support location estimation. The "target" device acts as a position estimation system "reference" device, responding to search device TOA ping sequences and employing the same ranging techniques that the "reference" device would use to support position estimation.

Within any given operational environment that supports position estimation, the devices within the system are continuously engaged in updating their own position estimates, as well as assisting other devices in updating their position estimates. Therefore, at any given time, a device may serve as a both a "master" device and "reference" device with respect to multiple different location estimate operations. In addition, while supporting position estimation system capabilities, a master device can simultaneously establish search mode with any single reference device, and may concurrently establish search mode with multiple devices, simultaneous serving as target and search device with respect to multiple search mode sessions. As a result, each communications device associated with a location estimating system that supports search mode is capable of serving, simultaneously, as a master, reference, search and target device. These respective roles are assumed on a real time, event driven basis, as dictated by operational needs.

Search mode is supported simultaneously with position system operations. At any point in time, any given communication device may serve, simultaneously, as a target with respect to some search mode transactions, and a search device with respect to other transactions. Search mode may be initiated in response to a wide variety of operational conditions in which it becomes operationally advantageous to quickly and effectively home in on individuals, equipment, or locations equipped with communications devices that support search mode. The manner in which search mode is initiated may include, but is not limited to the following. The search device can initiate search mode with a specific target device automatically or via a user controlled interface, in response to a search mode request from a target device, or in response to a search mode request from a centralized monitoring device. A user at a central control center or central monitoring console can remotely signal a target device and direct the target device to initiate search mode requests. A user of a device can manually initiate a search mode request. As used herein, a "search mode request" includes any mechanism by which target devices and/or monitoring devices notify potential search devices of the need to locate a specific target device.

In environments where devices are within broadcast range of one another, devices can automatically initiate/terminate search mode once a device enters/departs a user configurable radius of another device. Range information can be integrated with location information presented via the user interface or directly presented in a manner more useful to a search device used to "home-in" upon the target device. However, in situations where devices are extended over large areas, comprised of multiple, overlapping, or barely touching, broadcast areas, such as heavily obstructed urban canyons, or the below level decks of the many battleships that comprise a fleet, more sophisticated approaches may be used that provide users with more control over the use of the search mode capability.

Figure 9:
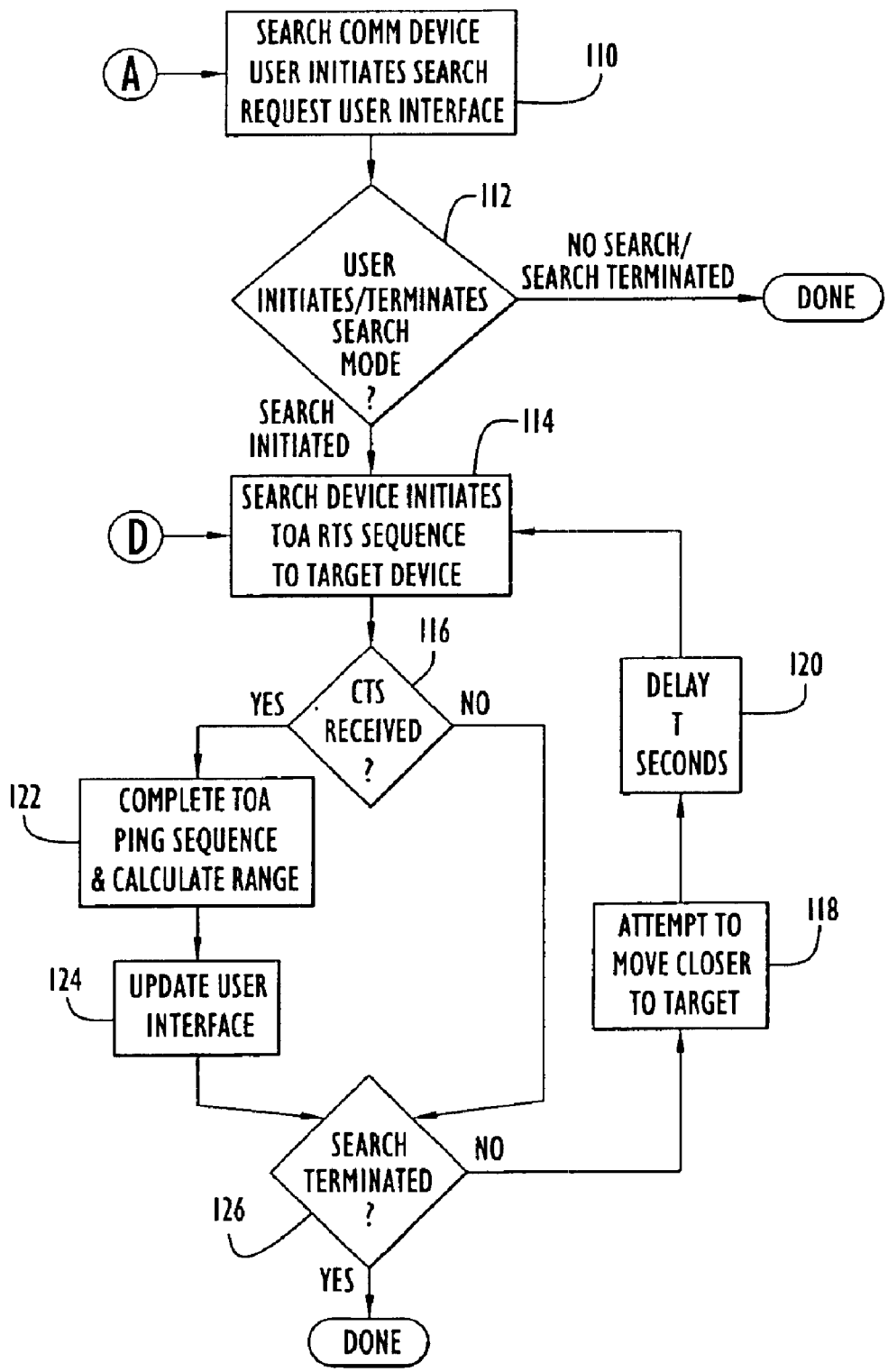
FIG. 9 is a flowchart depicting the initiation of "search mode" by a search communication device in accordance with an exemplary embodiment of the present invention.
Figure 10:
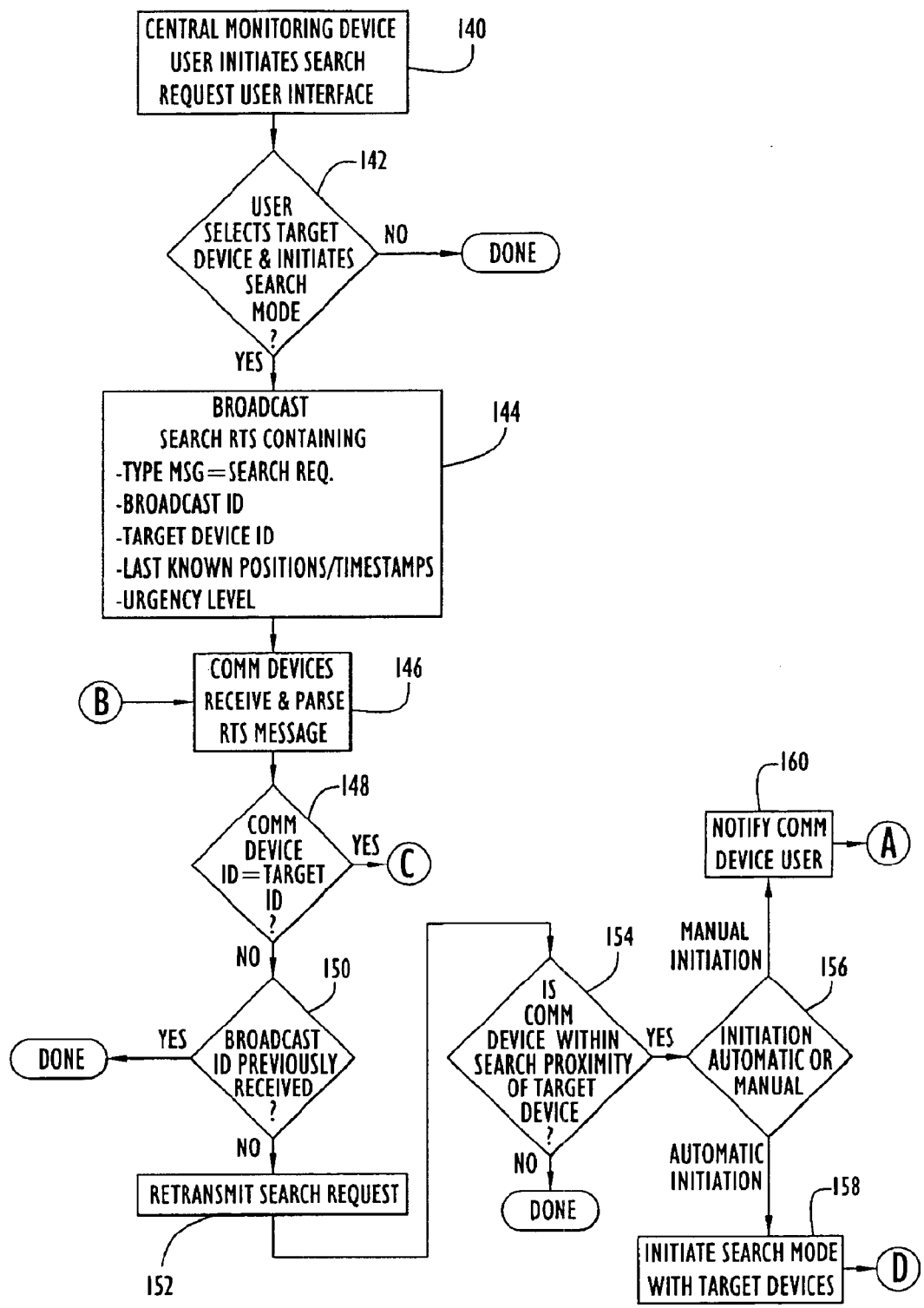
FIG. 10 is a flowchart depicting a "search mode request" by a target communication device in accordance with an exemplary embodiment of the present invention.
Figure 11:
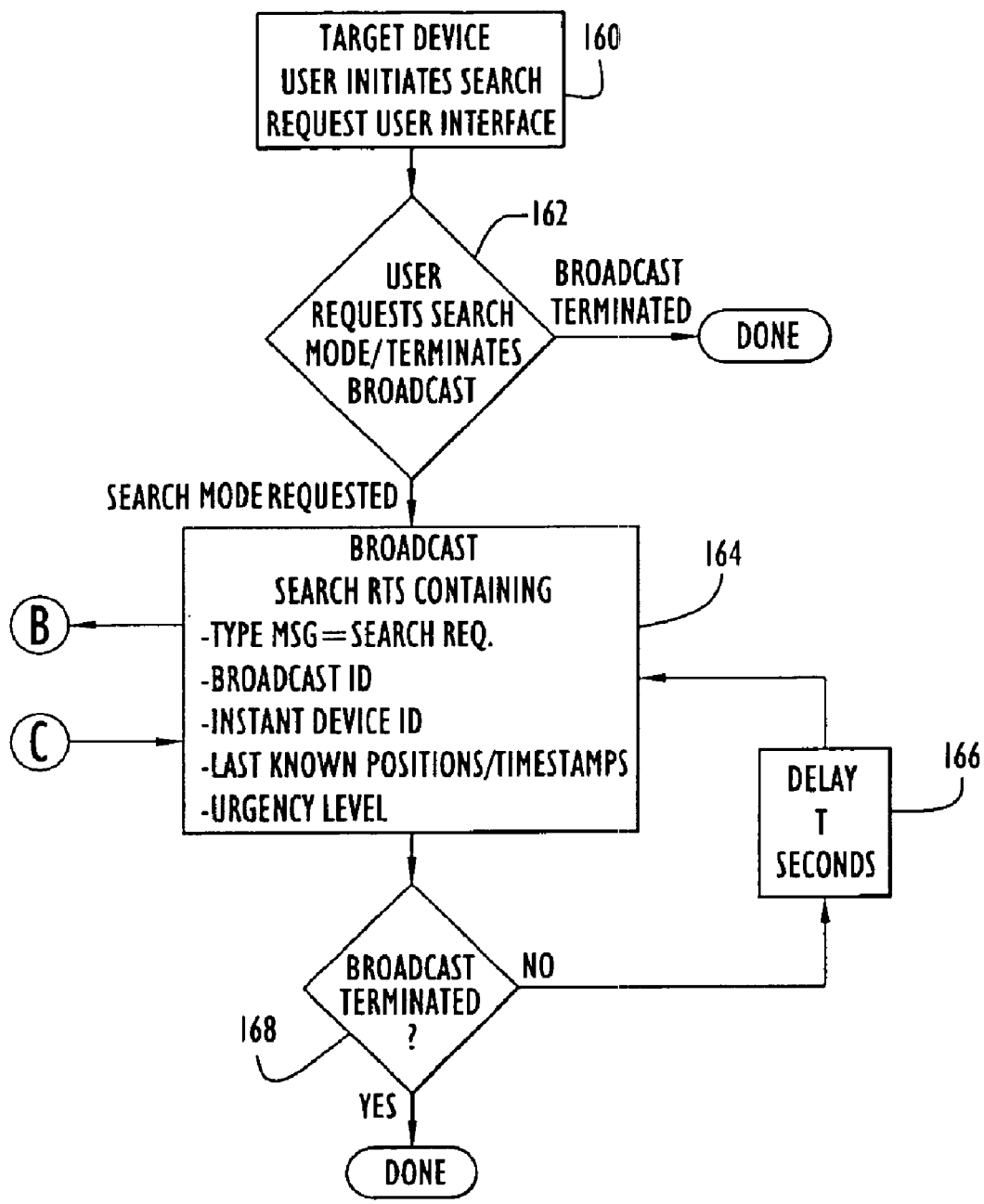
FIG. 11 is a flowchart depicting a "search mode request" by a central monitoring communication device in accordance with an exemplary embodiment of the present invention.
Figure 12:
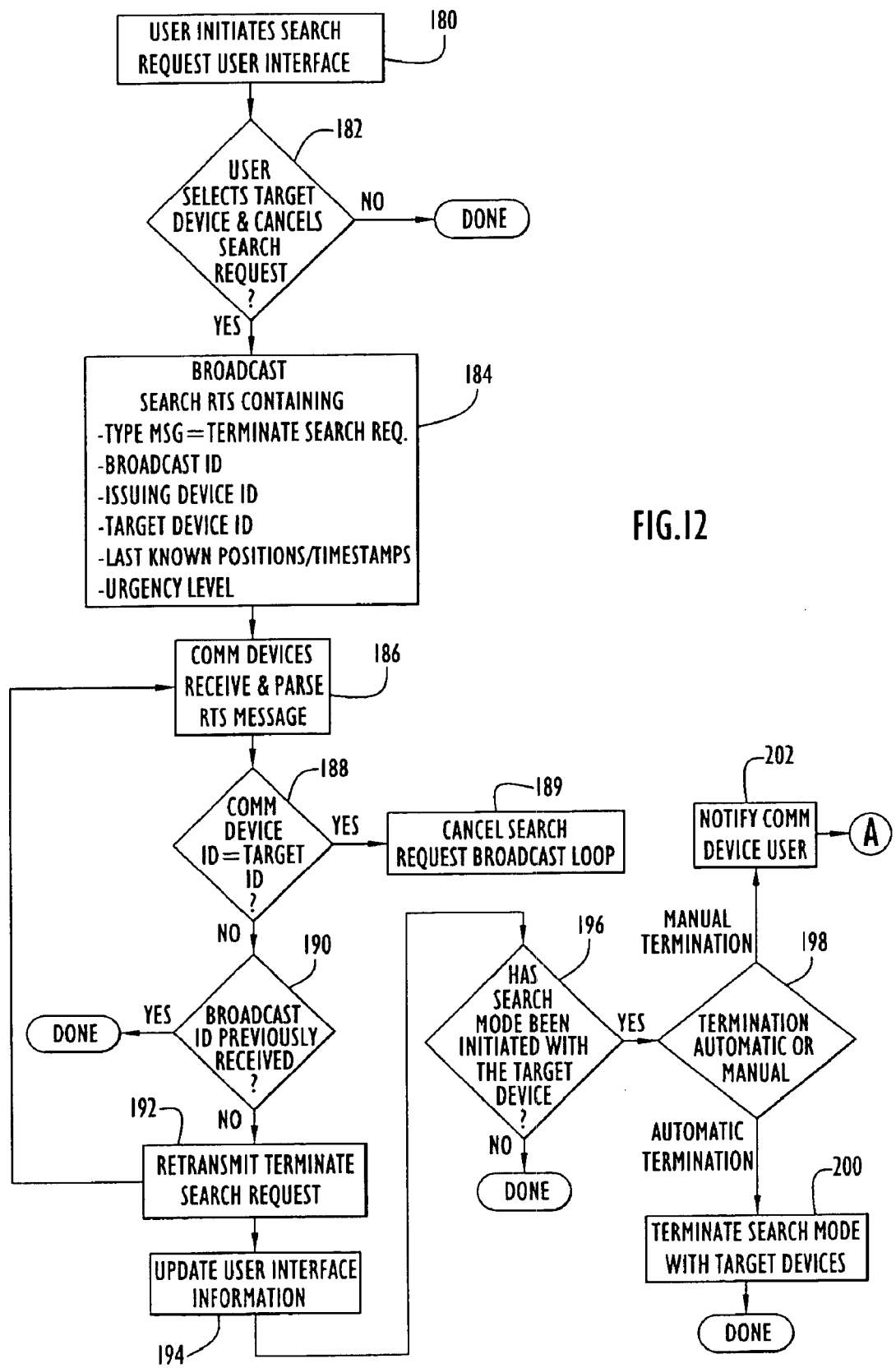
FIG. 12 is a flowchart depicting termination of a "search mode request" that has been broadcast to multiple devices in accordance with an exemplary embodiment of the present invention.

FIGS. 9 through 12 present high-level functional flow representations associated with the initiation, execution, and termination of "search mode" in accordance with the preferred embodiments of the present invention. Three ways in which "search mode" may be initiated in a complex broadcast environment are discussed: by direct initiation by a search device (FIG. 9); by indirect initiation by a centralized monitoring device (FIG. 10, followed by FIG. 9); and, by request of the designated target device (FIG. 11, followed by FIGS. 10 and 9). FIG. 12 addresses the cancellation of a search request that has been broadcast to multiple devices, possibly in multiple broadcast areas.

As depicted in FIG. 9, search mode can be directly initiated by a search device. Such a request can be made under any number of situations. For example, the individual in possession of the search device can obtain information that an individual or object collocated with the target communications device needs to be located.

In step 110, the user initiates the device search request user interface. By way of non-limiting example, the search device user interface can provide an operational awareness style LCD display that presents the location of all known devices in a specified vicinity and allow the user to select the desired target device. Alternatively, the user interface can present a list of potential target devices and associated information, such as the name/identifier of the individual/equipment to which the device has been assigned, and allow the search device user to choose a device from the list.

In step 112, the user reviews information presented via the search request user interface and decides whether to select a target device and initiate search mode with that device. For example, the user may decide, based upon a review of the information presented to him, that it would not be advisable to initiate search mode at that time and close the search request user interface. The search request user interface can also be used to terminate search mode with a target device in response to notification that the search request for a target device has been terminated.

If the user selects a target device and initiates search mode with that device, CSMA/CA protocol based time of arrival (TOA) ping sequences addressed to the specific target device are initiated (step 114).

If the target device is not within broadcast range of the search device, or the signal is temporarily blocked, no clear to send (CTS) signal will be received in response to the RTS issued by the search device (step 116). Nevertheless, the search device display will continue to display the last known location of the target device, while the device user, attempts to move closer to the target device (step 118). The search device will attempt to re-initiate TOA ping sequences after a time delay period (step 120), until the user cancels the specific search via the search request user interface (steps 110–112). The amount of delay introduced between range TOA ping sequences can be static, established by a user configurable parameter, or dynamically controlled based upon a number of operational factors, such as the confidence factor associated with the last range value calculated, and/or the projected velocity of the target device.

Upon receiving a CTS response from the target device (step 116), the search device employs the above-described CSMA/CA based two-way time-of-arrival messaging scheme to accurately calculate the range to the target device (step 122).

The calculated range information is used to update the user interface (step 124). The search device continues to initiate TOA ping sequences and continues to update the user interface until the user cancels the search via the search device user interface (steps 110–112) or until search mode is automatically or manually terminated by a remote device.

As depicted in FIG. 10, search mode can also be indirectly initiated by a centralized monitoring device. Such a request can be made under any number of situations. For example, the individual in control of the centralized monitoring device may obtain information that an individual or device collocated with the target communications device needs to be located. Alternatively, initiating a search mode request for a specific communications device can be issued to assist others, by allowing them to home in upon that position.

In step 140, the user initiates the device search request user interface. For example, the search request user interface provides an operational awareness style LCD display that presents the location of all known devices in a specified vicinity and allows the user to select the desired target device. Alternatively, the user interface presents a list of potential target devices and associated information, and allow the user to choose a device from the list.

In step 142, the user reviews information presented via the search request user interface and decides whether to select a target device and initiate a search mode request for that device. For example, the user may decide, based upon a review of the information presented to him, that it would not be advisable to initiate a search mode request at that time and close the search request user interface.

As indicated in step 144, if the user of a centralized monitoring device initiates a search mode request, a CSMA/CA compatible request to send (RTS) signal with a modified RTS message is broadcast to all devices within broadcast range. Information that would be included in the RTS message can include: a code that identifies the broadcast as a search request message; a broadcast message unique identifier; a target device identifier; the last know location (s), with time stamp(s), of the device for which search mode is being requested; and search request nature/urgency code.

Devices within broadcast range of the requesting device will receive and parse the CSMA/CA compatible search request RTS message to retrieve and manipulate, for use by the device, the information contained within (step 146). For example, depending upon the operational environment in which the devices are used, the last know location(s), with time stamp(s), of the target device, may be used as a basis for determining the general direction and speed of the target device, and to predict future locations of the target device.

If the target device ID contained with the search mode request is the same as the device ID for the receiving device (step 148), the receiving device will begin broadcasting its own search mode request RTS messages (See FIG. 11, step 164). Otherwise, the receiving device checks the broadcast message unique identifier to see if the same broadcast message has been previously received (step 150). If the broadcast message has already been received, processing of the search request RTS is complete.

If the broadcast message unique identifier does not match any previously received within a predefined period of time, the search request RTS signal is rebroadcast by the receiving device, in its entirety, thereby allowing the initial range of the originating device to be greatly extended (step 152).

In step 154, the receiving device will process the target device's last know location information and the search request nature/urgency code and compare the results against user configurable user notification criteria. If the user notification criteria are met search mode may be either automatically and/or manually initiated. If manual initiation is preferred within the current operational environment, the search device user is notified of the pending search request via the device's user interface (step 160). The nature of the notification can vary based upon the nature of the device and the user interface supported. Such notification can range from a flashing light, audible alert, vibration, and/or a flashing indicator upon a LCD display. If automatic initiation is preferred, the device will immediately initiate TOA ping sequences with the identified target device (158).

As depicted in FIG. 11, a target device may initiate search mode by broadcasting search mode request RTS messages to prospective search devices. Search requests broadcasts may be initiated manually, via the search request user interface, or may be initiated automatically in response to a request by a remote device. The reasons for issuing a search request can vary. For example, an individual or device in control of the target device may determine that it needs to be located/visited. Alternatively, initiating a search mode request for the target device can be issued to assist others, by allowing them to home in upon that position.

In step 160, the user initiates the device search request user interface. On a target device, this interface can be merely a single button that initiates the search request. Alternatively, the interface can be more sophisticated, including such options as an LCD display and/or multiple buttons allowing the user to specify one or more options, such as the nature and/or urgency of the search request.

Next, the user reviews information presented via the search request user interface, if any, and decides whether to initiate a search request (162).

As indicated in step 164, if the user of a target device initiates a search mode request, a CSMA/CA compatible request to send (RTS) signal with a modified RTS message is broadcast to all devices within broadcast range. Information that would be included in the RTS message can include: a code that identifies the broadcast as a search request message; a broadcast message unique identifier; a target device identifier that matches that of the instant device; the last know location(s), with time stamp(s), of the instant device; and search request nature/urgency code. These RTS broadcasts are rebroadcast after a preset, or user configurable, time delay (step 166), or until the broadcasts are termination (step 168).

FIG. 9, addressing the initiation of search mode by a search device, and FIG. 11, addressing the initiation of search mode by a target device, each address cancellation of search mode with respect to the termination of activities performed by the respective search or target device from which the termination is issued. In the case of a search mode request, issued by a target device or a central monitoring device, that has been broadcast to all devices, additional action is required to inform all devices that a search has been terminated. FIG. 12 presents a high-level functional flow diagram associated with the termination of a "search mode request."

As indicated in step 180, the user initiates the device search request user interface. In the preferred embodiment, the search request user interface would provide an operational awareness style LCD display that presents the location of all known devices in a specified vicinity for which searches have been initiated and allow the user to select the desired target device. Alternatively, the user interface can present a list of target devices for which searches have been initiated and their associated information, and allow the user to choose a device from the list.

In step 182, the user reviews information presented via the search request user interface and decides whether to select a target device and terminate search mode for that device. For example, the user may decide, based upon a review of the information presented to him, that it would not be advisable to terminate search mode request at that time and close the search request user interface.

As indicated in step 184, if the user decides to terminate a search request, a CSMA/CA compatible request to send (RTS) signal with a modified RTS message is broadcast to all devices within broadcast range. Information contained in the RTS message can include: a code that identifies the broadcast as a terminate search request message; a broadcast message unique identifier; a device identifier of the device issuing the terminate search request; device identifier of the original search request target device; the last know location(s), with time stamp(s), of the original search request target device; and search request nature/urgency code.

Devices within broadcast range of the requesting device receive and parse the CSMA/CA compatible message to retrieve the information contained within (step 186). If the target device ID is the same as the device ID for the receiving device (step 188), the target device cancels its current search request loop in which it cyclically broadcasts search request RTS messages (step 189). (Refer to FIG. 11.) Otherwise, the receiving device checks the broadcast message unique identifier to see if the same broadcast message has been previously received (step 190). If the broadcast message has already been received, processing of the search request RTS is complete.

If the broadcast message unique identifier does not match any previously received within a predefined period of time, the terminate search request RTS signal is rebroadcast, in its entirety, thereby allowing the initial range of the originating device to be greatly extended (step 192). The receiving device will then update the local data store that is used to support the search request user interface to reflect that the search request for the identified device has been terminated (step 194) and then checks to see if receiving device has already initiated search mode with the identified target device (step 196).

If search mode has already been established with the identified target device, search mode may be either automatically and/or manually terminated. If manual termination is preferred within the context of the current operational environment, the search device user is notified of the cancellation of the search request via the device's user interface (step 202). The nature of the notification can vary based upon the nature of the device and the user interface supported. Such notification can range from a flashing light, audible alert, vibration, and/or a flashing indicator upon a LCD display. If automatic initiation is preferred, the device will immediately terminate search mode related TOA ping sequences with the identified target device (200).

The high accuracy search mode capability of the present invention uses ranging techniques to enhance the capability of existing position estimating systems with the ability to pinpoint the physical location of a target communications device. Any position estimating system may be used to guide the search device to the general proximity of the target device. Furthermore, the target device may use any means by which to ascertain its initial position estimate. For example, the target device could use a position estimate obtained through manual user input obtained from a map or sign. Alternatively the information could be received from a fixed position transponder or even calculated based upon the reception of global position system (GPS) signals.

The present invention increases the probability of a successful physical search, despite the level of accuracy achieved by the position estimation system used to guide the search device to the general vicinity of the target device. Operationally viable position estimation systems can be assembled using communications devices of lessor and/or varying position estimation accuracy, allowing optimization of cost, size, weight, and power related considerations, without sacrificing the probability of being able to successfully pinpoint the physical position of the target device.

The high accuracy search mode capability of the present invention is fully compatible with, and can be engaged simultaneously with ongoing position estimation system capabilities, allowing resulting range information to be integrated into a single user interface display, or presented separately. The disclosed invention is capable of tracking and homing in a wide array of applications, including the tracking and location of people and items such as: military personnel and equipment, emergency personnel and equipment, valuable items, vehicles, mobile telephones, children, prisoners and parolees.

The disclosed invention includes spread spectrum signal analysis and processing to minimize the effects of interference caused by multipath signal propagation upon the ability to accurately determine the range between a search device and a target device, even under severe multipath conditions. The ability to accurate determine range under such conditions allows the device to home in upon the exact physical location a mobile communication device in a variety of environments, including urban areas and inside buildings where multipath interference can be severe.

A communications device that is accordance with the present invention is capable can calculate and store its own location/time estimates using various location estimation techniques; receive and store estimates pertaining to its own location/time from at least one of a variety of external sources; receive and/or store multiple estimates pertaining to the location/time of one or more communications devices, including itself; and, the to exchange (i.e., transmit, receive and store) past and last known location/time estimates with other communications devices. This information can be used by the communications device to project the probable course and physical location of a target communications device based upon last known location/time estimates pertaining to the target device.

The technology is small enough to fit within a compact, handheld or portable mobile communication device and can be remotely or manually engaged without disrupting simultaneous voice and/or data communications services supported by the device. The disclosed approach employs, where practical, existing hardware and software to carry out portions of the TOA estimation process, thereby minimizing design and manufacturing costs.

The system of the present invention can be used to track and physically pinpoint the location of non-military personnel and resources located both indoors or outdoors, including but not limited to: police engaged in tactical operations; firefighters located near or within a burning building; medical personnel and equipment in a medical facility or en route to an emergency scene; and personnel involved in search and rescue operations.

The system of the present invention can be used to track and physically pinpoint the location of high-value items by tagging items or embedding a mobile radio in items such as personal computers, laptop computers, portable electronic devices, luggage (e.g., for location within an airport), briefcases, valuable inventory, and stolen automobiles. Locate/track capabilities can be initiated without multiple reference devices in the area surrounding the device to be tracked.

In urban environments, where conventional position determining systems have more difficulty operating, the system of the present invention can reliably track and physically pinpoint the location of commercial or industrial vehicles, including trucks, buses and rental vehicles equipped with mobile radios. The ability to track and physically pinpoint the location of people carrying a mobile communication device is also desirable in a number of contexts, including, but not limited to: children in a crowded environment such as a mall, amusement park or tourist attraction; location of personnel within a building; and location of prisoners in a detention facility. The mobile radio can be carried on the body by incorporating the radio into clothing, such as a bracelet, a necklace, a pocket or the sole of a shoe.

In shipping and material transportation, equipment and personnel that are in constant transit through highly obstructed areas, such as metal warehouses, loading docks and rail stations can be easily tracked and physically located, even once loaded within the closed decks of multiple ships comprising a merchant marine or military fleet.

While the present invention has been described above in the context of a system that transmits and receives electomagnetic signals through the air, it will be appreciated that the two-way round-trip ranging technique, including the internal delay calibration and TOA processing can be used in other mediums and with other types of signals, including, but not limited to: electromagnetic signals transmitted through solid materials, water or in a vacuum; pressure waves or acoustic signals transmitted through any medium (e.g., seismic, sonar or ultrasonic waves).

Depending upon the levels of location accuracy, low probability of detection, and/or confidentiality required, communications devices of varying capability can be assembled from the capabilities disclosed, herein, based upon modular architecture. For example, disclosed curve fitting and frequency diversity features need only be included in a communications device if the enhanced location accuracy provided by such features is required. By such modular design, the disclosed technology is capable of supporting the most stringent of military special force requirements, as well as the reduced operational requirements demanded by civilian search and rescue operations.

Having described preferred embodiments of new and improved method and apparatus for determining the position of a mobile communication device, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of pinpointing the physical position of a target communication device, comprising:
    (a) determining a position of the target communication device with sufficient accuracy to direct a search communication device to within a vicinity of the target communication device;
    (b) repeatedly measuring the range between the target communication device and the mobile search communication device once the search communication device is within the vicinity by repeatedly exchanging an outbound ranging signal and a reply ranging signal between the target communication device and the search communication device and determining a round-trip signal propagation time of the outbound ranging signal and the reply ranging signal; and
    (c) directing movement of the search communication device toward the target communication device in response to the repeatedly measured range, thereby pinpointing the position of the target communication device by reducing the range between the search and target communication devices, wherein synchronization of system clocks of the target communication device and the mobile search communication device is not necessary.

2. The method of claim 1, wherein (a) includes determining the position of the target communication device from measurements of ranges between the target communication device and reference communication devices whose positions are known.

3. The method of claim 1, wherein (a) includes determining the position of the target communication device based upon a position entered manually via a user interface.

4. The method of claim 1, wherein the target communication device initiates a search for itself by broadcasting a search mode request.

5. The method of claim 1, wherein a central control device initiates a search for the target communication device by broadcasting a search mode request to potential search devices.

6. The method of claim 5, wherein communication devices not within the vicinity of the target communication device retransmit search mode requests broadcasted by the central control device, thereby extending the broadcast range of the central control device.

7. The method of claim 1, wherein the search communication device initiates a search for the target communication device by transmitting a search mode request to the target communication device.

8. A search communication device for pinpointing the physical position of a target communication device in a vicinity of the search communication device, comprising:
- a transmitter configured to transmit an outbound ranging signal to the target communication device;
- a receiver configured to receive a reply ranging signal from the reference communication device in response to the outbound ranging signal; and
- a processor configured to determine the range to the target communication device from a round-trip signal propagation time of the reply ranging signal and the outbound ranging signal,
- wherein said search communication device is configurable to operate in a search mode in which said search communication device repeatedly determines the range to the target communication device to enable an operator to direct movement of the search communication device toward the target communication device, thereby pinpointing the position of the target communication device by reducing the range between the search and target communication devices, and wherein synchronization of system clocks of the target communication device and the mobile search communication device is not necessary.

9. The search communication device of claim 8, wherein said search communication device is initially directed to a vicinity of the target communication device by an estimate of the position of the target communication device determined measurements of ranges between the target communication device and reference communication devices whose positions are known.

10. The search communication device of claim 8, wherein said search communication device is initially directed to a vicinity of the target communication device based on a position of the target communication device entered manually via a user interface.

11. The search communication device of claim 8, wherein the search mode is initiated by a broadcast search mode request transmitted by the target communication device.

12. The search communication device of claim 8, wherein the search mode is initiated by a broadcast search mode request transmitted by a central control device.

13. The search communication device of claim 12, wherein said search communication device retransmits search mode requests broadcasted by the central control device when said search communication device is not within the vicinity of the target communication device, thereby extending the broadcast range of the central control device.

14. The search communication device of claim 8, wherein said search communication device initiates a search for the target communication device by transmitting a search mode request to the target communication device.

15. The search communication device of claim 8, wherein said search communication device is a handheld device.

16. The search communication device of claim 8, wherein said search communication device is configured to be carried on a human body.

17. The search communication device of claim 8, wherein said search communication device is configured to operate in search mode onboard a moving vehicle.

18. The search communication device of claim 8, wherein said search communication device is capable of exchanging ranging signals with a target communication device located indoors.

19. A search communication device for pinpointing the physical position of a target communication device in a vicinity of the search communication device, comprising:
- means for transmitting an outbound ranging signal to the target communication device;
- means for receiving a reply ranging signal from the reference communication device in response to the outbound ranging signal; and
- means for determining the range to the target communication device from a round-trip signal propagation time of the reply ranging signal and the outbound ranging signal, wherein said search communication device is configurable to operate in a search mode in which said search communication device repeatedly determines the range to the target communication device to enable an operator to direct movement of the search communication device toward the target communication device, thereby pinpointing the position of the target communication device by reducing the range between the search and target communication devices, wherein synchronization of system clocks of the target communication device and the mobile search communication device is not necessary.

20. The search communication device of claim 19, wherein said search communication device is initially directed to a vicinity of the target communication device by an estimate of the position of the target communication device determined measurements of ranges between the target communication device and reference communication devices whose positions are known.

21. The search communication device of claim 19, wherein said search communication device is initially directed to a vicinity of the target communication device based on a position of the target communication device entered manually via a user interface.

22. The search communication device of claim 19, wherein the search mode is initiated by a broadcast search mode request transmitted by the target communication device.

23. The search communication device of claim 19, wherein the search mode is initiated by a broadcast search mode request transmitted by a central control device.

24. The search communication device of claim 23, wherein said search communication device retransmits search mode requests broadcasted by the central control device when said search communication device is not within the vicinity of the target communication device, thereby extending the broadcast range of the central control device.

25. The search communication device of claim 19, wherein said search communication device initiates a search for the target communication device by transmitting a search mode request to the target communication device.

26. The search communication device of claim 19, wherein said search communication device is a handheld device.

27. The search communication device of claim 19, wherein said search communication device is configured to be carried on a human body.

28. The search communication device of claim 19, wherein said search communication device is configured to operate in search mode onboard a moving vehicle.

29. The search communication device of claim 19, wherein said search communication device is capable of exchanging ranging signals with a target communication device located indoors.

30. A system for pinpointing the physical position of a target communication device, comprising:
- a search communication device configured to transmit an outbound ranging signal and receive a reply ranging signal;

a target mobile communication device configured to receive the outbound ranging signal and transmit the reply ranging signal to said search communication device, said search communication device determining the range to the target communication device from a round-trip signal propagation time of the reply ranging signal and the outbound ranging signal, wherein said search and target communication devices are configurable to operate in a search mode in which said search communication device repeatedly determines the range to said target communication device to enable an operator to direct movement of said search communication device toward said target communication device, thereby pinpointing the position of said target communication device by reducing the range between said search and target communication devices, and wherein synchronization of system clocks of the target communication device and the mobile search communication device is not necessary.

31. The system of claim 30, wherein said search communication device is initially directed to a vicinity of the target communication device by an estimate of the position of the target communication device determined measurements of ranges between the target communication device and reference communication devices whose positions are known.

32. The system of claim 30, wherein said search communication device is initially directed to a vicinity of the target communication device based on a position of the target communication device entered manually via a user interface.

33. The system of claim 30, wherein the search mode is initiated by a broadcast search mode request transmitted by the target communication device.

34. The system of claim 30, wherein the search mode is initiated by a broadcast search mode request transmitted by a central control device.

35. The system of claim 34, wherein said search communication device retransmits search mode requests broadcasted by the central control device when said search communication device is not within the vicinity of the target communication device, thereby extending the broadcast range of the central control device.

36. The system of claim 30, wherein said search communication device initiates a search for the target communication device by transmitting a search mode request to the target communication device.

37. The system of claim 30, wherein said target communication device is a handheld device.

38. The system of claim 30, wherein said target communication device is configured to be carried on a human body.

39. The system of claim 30, wherein said target communication device is incorporated into clothing worn on the body.

40. The system of claim 30, wherein said target communication device is a mobile telephone.

41. The system of claim 30, wherein said search and target communication devices operate in the search mode onboard moving vehicles.

42. The system of claim 30, wherein said search and target communication devices are capable of exchanging ranging signals while indoors.

* * * * *